(12) United States Patent
Sakakibara et al.

(10) Patent No.: US 8,964,263 B1
(45) Date of Patent: Feb. 24, 2015

(54) IMAGE READING DEVICE

(71) Applicant: Brother Kogyo Kabushiki Kaisha, Nagoya-shi, Aichi-ken (JP)

(72) Inventors: Arisa Sakakibara, Nagoya (JP); Takayuki Akimatsu, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/227,652

(22) Filed: Mar. 27, 2014

(30) Foreign Application Priority Data

Sep. 27, 2013 (JP) ................................. 2013-202505

(51) Int. Cl.
*H04N 1/04* (2006.01)
*H04N 1/00* (2006.01)

(52) U.S. Cl.
CPC ....... *H04N 1/00535* (2013.01); *H04N 1/00588* (2013.01); *H04N 1/00625* (2013.01); *H04N 1/00551* (2013.01)
USPC ............................. 358/474; 358/498; 399/367

(58) Field of Classification Search
CPC ... H04N 1/04; H04N 1/12; H04N 2201/0081; H04N 1/00551; H04N 1/00588; G03B 42/02; G03B 17/34; G03B 17/52; G03B 21/118; G03B 27/525; G03B 27/587; G09B 21/004; G06F 3/121; G06F 3/1234
USPC ........ 358/474, 498, 496, 461, 1.14, 408, 486, 358/494, 497, 505; 399/367
See application file for complete search history.

(56) References Cited

U.S. PATENT DOCUMENTS

| | | | | |
|---|---|---|---|---|
| 5,526,141 A * | 6/1996 | Ogura et al. | ................... | 358/496 |
| 5,732,321 A * | 3/1998 | Ishizuka et al. | ............... | 399/391 |
| 5,773,839 A * | 6/1998 | Krepel et al. | ................. | 250/580 |
| 6,898,395 B2 * | 5/2005 | Mui et al. | ....................... | 399/107 |
| 7,260,342 B2 * | 8/2007 | Nishimura | .................... | 399/113 |
| 7,341,387 B2 * | 3/2008 | Nishimura et al. | ........... | 400/693 |
| 7,604,228 B2 * | 10/2009 | Ohama et al. | ................. | 271/3.14 |
| 7,674,057 B2 * | 3/2010 | Nishimura et al. | ........... | 400/693 |
| 7,793,928 B2 * | 9/2010 | Ohama et al. | ................. | 271/121 |
| 8,482,815 B2 * | 7/2013 | Ikeno et al. | .................... | 358/474 |
| 2002/0056957 A1 | 5/2002 | Sekine | | |
| 2010/0252987 A1 | 10/2010 | Furuyama et al. | | |

(Continued)

FOREIGN PATENT DOCUMENTS

| | | |
|---|---|---|
| JP | 2002-145457 A | 5/2002 |
| JP | 2010-245624 A | 10/2010 |

(Continued)

*Primary Examiner* — Negussie Worku
(74) *Attorney, Agent, or Firm* — Merchant & Gould PC

(57) ABSTRACT

An image processing device includes a housing with a sheet conveyor situated in the housing. An interlock mechanism includes a first engagement member extending from a second surface of a first cover; and a second engagement member extending from a second surface of a second cover. One of the first and second engagement members is engagable with the other of the first and second engagement members. When the first cover moves from a first position to a second position, the first and second engagement members engage to move one end portion of the second cover in response to a movement of the first engagement member away from the second cover, and when the first cover moves from the second position to the first position, the first engagement member engages the second engagement member to move the second cover to a first position.

20 Claims, 15 Drawing Sheets

(56) References Cited

U.S. PATENT DOCUMENTS

2011/0242624 A1 10/2011 Takeuchi et al.
2012/0155941 A1 6/2012 Kozaki et al.

FOREIGN PATENT DOCUMENTS

| JP | 2011-211478 A | 10/2011 |
|---|---|---|
| JP | 2012-126530 A1 | 7/2012 |

* cited by examiner

IMAGE READING DEVICE

CROSS-REFERENCE TO RELATED APPLICATION

This application claims priority from Japanese Patent Application No. 2013-202505, filed on Sep. 27, 2013, which is incorporated herein by reference in its entirety.

TECHNICAL FIELD

Aspects disclosed herein generally relate to an image processing device.

BACKGROUND

Image processing devices, such as an automatic-document-feeder ("ADF") type image reading device reads an image from a document while conveying the document.

Such an image reading device includes a tray for supporting one or more documents. The tray is configured to be capable of being opened and closed. In an open state, the tray is inclined with respect to a device upper surface of the image reading device. In a closed state, the tray lies to constitute a portion of the device upper surface. At the time of reading an image from a document, the tray is opened to support one or more documents thereon.

SUMMARY

Accordingly, for example, some embodiments of the disclosure provide for an image reading device in which a housing has a sheet conveyor situated therein. A first cover part is movably connected to the housing and has a first surface and a second surface opposite the first surface. The first cover part is movable between a first position and a second position. A second cover part is movably connected to the housing and has a first surface and a second surface opposite the first surface, the second cover part being movable between a first position and a second position. In some examples, the respective first positions of the first and second cover parts is a closed position where a top surface of the housing is covered, and the second position is an open position where at least part of the top surface of the housing is exposed.

An interlock mechanism includes a first engagement member extending from the second surface of the first cover and a second engagement member extending from the second surface of the second cover. One of the first and second engagement members is engagable with the other of the first and second engagement members. For example, in one implementation the first engagement member extends from the second surface of the first cover part to selectively engage the second engagement member extending from the second surface of the second cover part. When the first cover moves from the first position to the second position, the first and second engagement members engage to move one end portion of the second cover in response to a movement of the first engagement member away from the second cover. When the first cover moves from the second position to the first position, the first engagement member engages the second engagement member to move the second cover to the first position.

DESCRIPTION OF THE DRAWINGS

For a more complete understanding of the present disclosure, needs satisfied thereby, and the objects, features, and advantages thereof, reference now is made to the following descriptions taken in connection with the accompanying drawings.

DETAILED DESCRIPTION

In the following detailed description, reference is made to the accompanying drawings which form a part hereof, and in which is shown by way of illustration specific examples. In this regard, directional terminology, such as "up," "down," "front," "rear," etc., is used with reference to the orientation of the Figure(s) being described. Because the various components can be positioned in a number of different orientations, the directional terminology is used for purposes of illustration and is in no way limiting. It is to be understood that other versions may be utilized and structural or logical changes may be made without departing from the scope of the present invention. The following detailed description, therefore, is not to be taken in a limiting sense. It is to be understood that features of the various examples described herein may be combined with each other, unless specifically noted otherwise.

<Overall Configuration>

In some image processing devices, if an inclination angle of a document feeder tray in its open state is large, there may be a possibility that a document might not be conveyed smoothly on the tray. Therefore, the inclination angle of the tray in the open state may need to be smaller. Nevertheless, the device upper surface may include an upper cover at a position toward which the tray may be opened. Thus, some contrivance to avoid interference between the tray and the upper cover may be needed to decrease the inclination angle of the tray in the open state.

According some aspects of the disclosure, an interlock mechanism is provided wherein the end, which may be disposed closer to the first cover, of the second cover may move downward during the movement of the first cover from the closed position to the open position. Therefore, while interference between the first cover and the second cover is avoided, an inclination angle of the first cover at the open position may be decreased. Consequently, a sheet may be conveyed smoothly on the support surface of the first cover.

Figure 1:
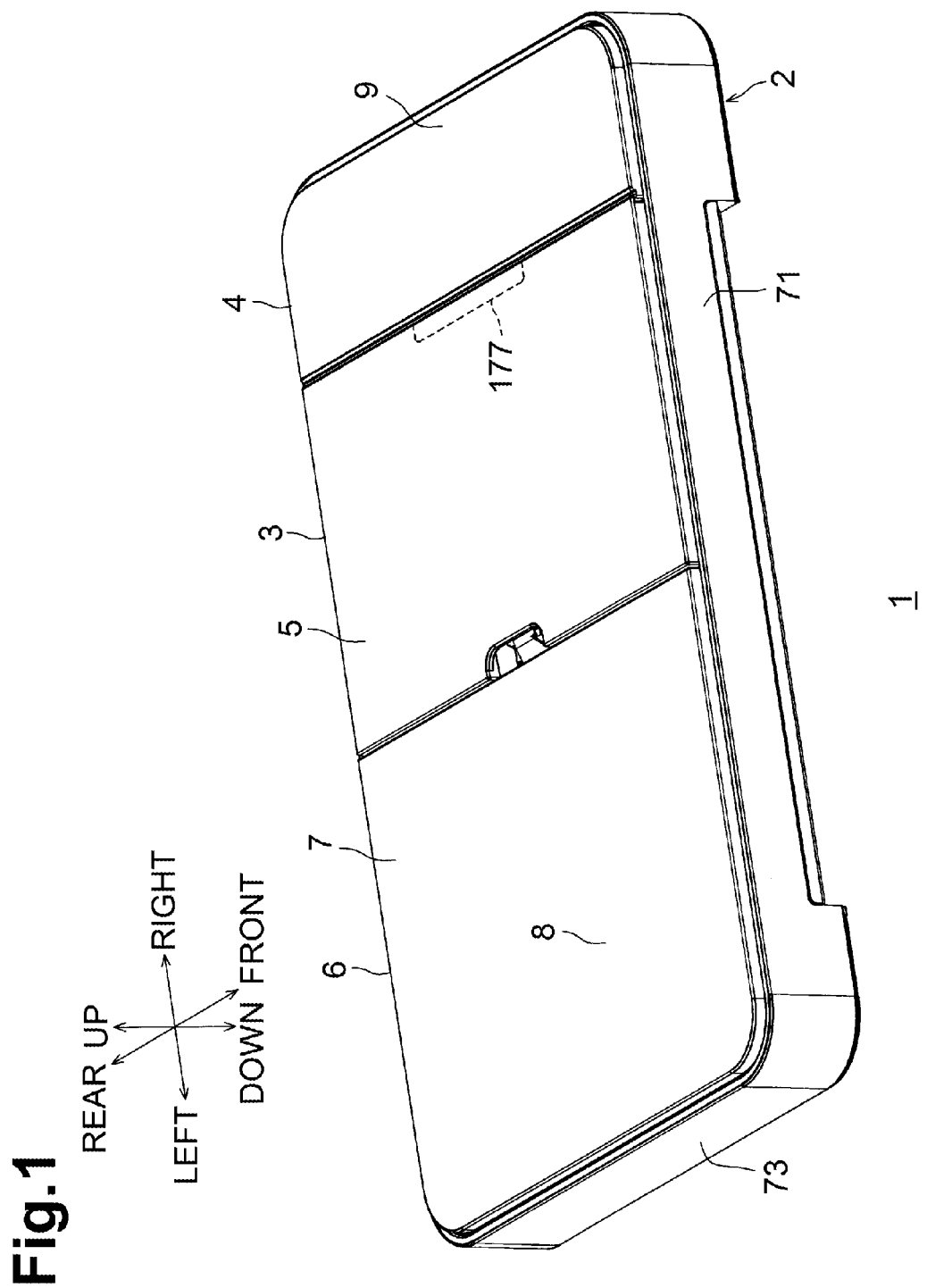
FIG. 1 is a perspective view depicting an image reading device in an illustrative embodiment according to one or more aspects of the disclosure, wherein a first cover is located at a cover position.
Figure 2:
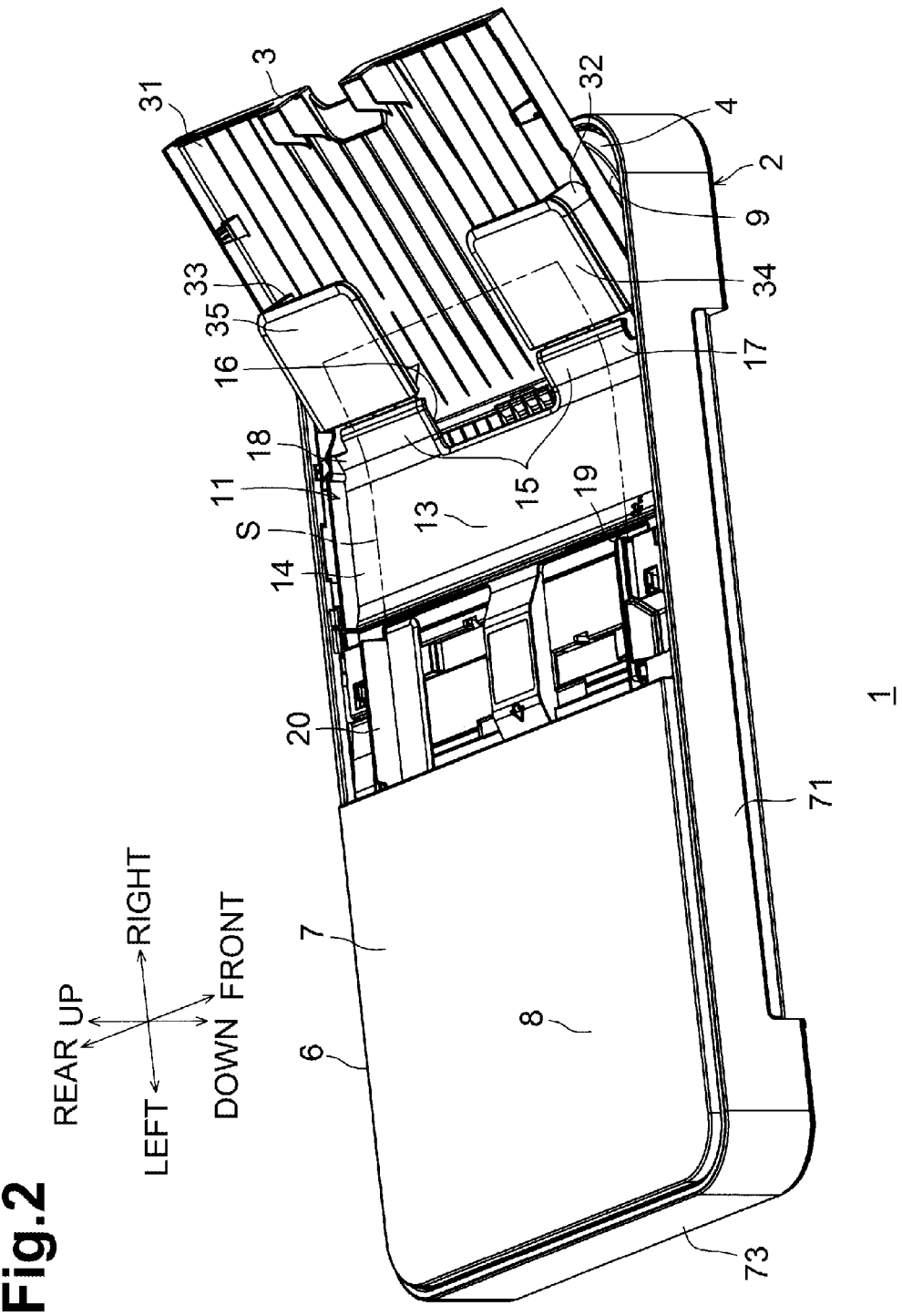
FIG. 2 is a perspective view depicting the image reading device in the illustrative embodiment according to one or more aspects of the disclosure, wherein the first cover is located at a tray position.
Figure 3:
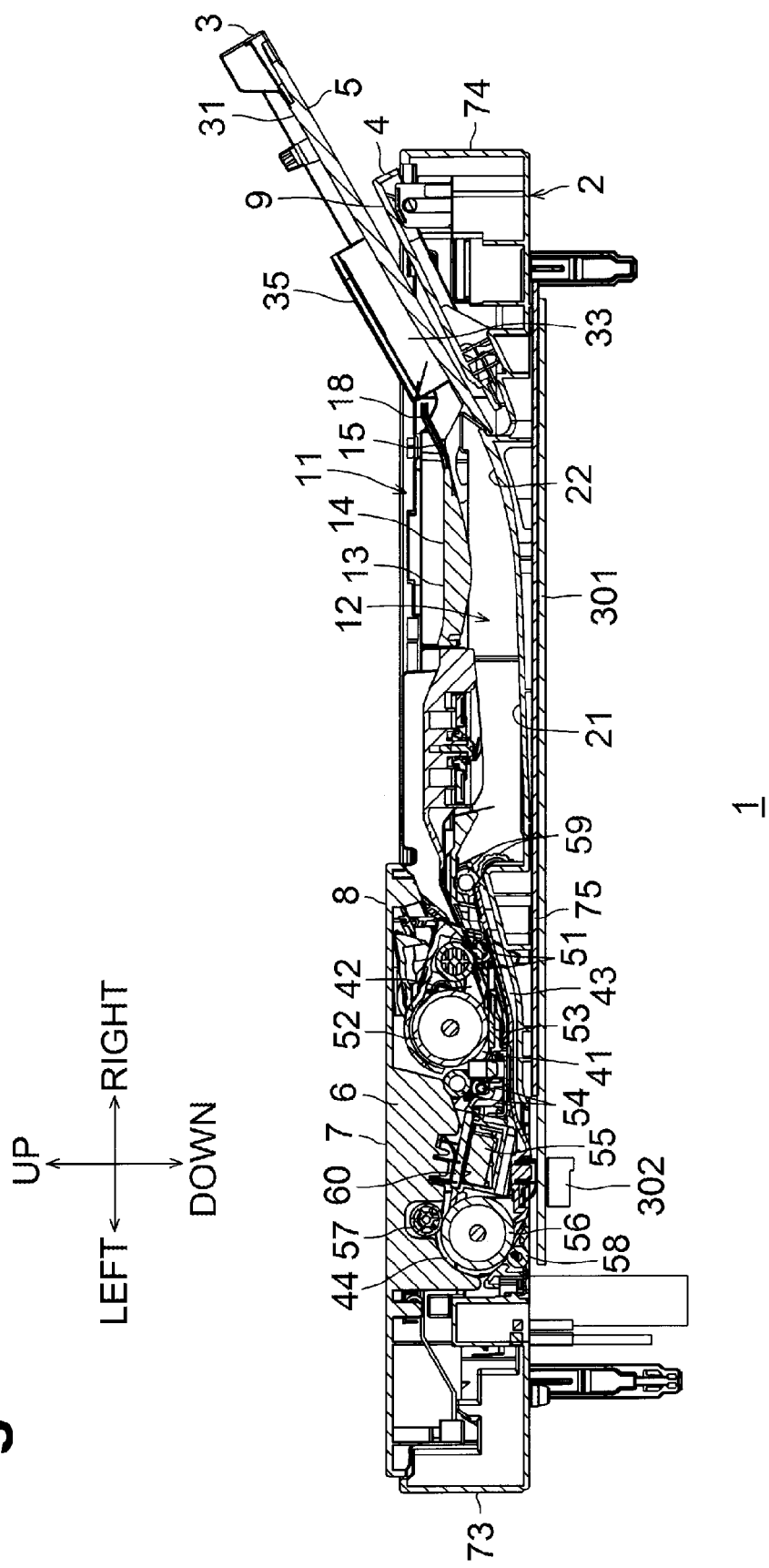
FIG. 3 is a midsectional view depicting the image reading device in the illustrative embodiment according to one or more aspects of the disclosure.

FIGS. 1, 2, and 3 depict an example of an image processing device in accordance with aspects of the present disclosure. The image processing device 1 may comprise a housing 2, a first cover 3, and a second cover 4. The first cover 3 and the second cover 4 may be supported adjacent to each other by the housing 2 and movably connected thereto.

In the image processing device 1, a side on which the first cover 3 and the second cover 4 may be disposed may be defined as an upper side, and a side on which the second cover 4 may be disposed with reference to the first cover 3 may be defined as the right. With reference to these directions, directions of up, down, right, left, front, and rear may be defined. In the drawings of FIGS. 1 to 14I, these directions are indicated by arrows.

The first cover 3 may be deviated to the right with respect to a middle position in the housing 2 in the right-left direction. The first cover 3 may be movable between a first, or cover position depicted in FIG. 1 and a second, or tray position depicted in FIG. 2. As depicted in FIG. 1, at the cover position, the first cover 3 may extend along an upper edge of the housing 2 and constitute a portion of an upper cover that may cover an upper side of the housing 2. In a state where the first cover 3 is located at the cover position, an upper surface 5 of the first cover 3 may be coplanar with an upper surface 7 of a fixed cover 6 disposed on the right of the first cover 3. The upper surface 5 of the first cover 3 may constitute a portion of a flat device upper surface 8 of the image processing device 1 in conjunction with the upper surface 7 of the fixed cover 6. As depicted in FIG. 2, at the tray position, the first cover 3 may be inclined upward to the right and protrude from the housing 2.

The second cover 4 may be movable between a first, or higher position depicted in FIG. 1 and a second, or lower position depicted in FIG. 2. At the higher position, as depicted in FIG. 1, the second cover 4 may extend along the upper edge of the housing 2 and constitute a portion of the upper cover that may cover the upper side of the housing 2. In a state where the first cover 3 is located at the cover position and the second cover 4 is located at the higher position, an upper surface 9 of the second cover 4 may be coplanar with the upper surface 5 of the first cover 3 and the upper surface 7 of the fixed cover 6. The upper surface 9 of the second cover 4 may constitute a portion of the flat device upper surface 8 of the image processing device 1. As depicted in FIG. 2, at the lower position, the second cover 4 may be inclined downward to the left from an upper portion of the housing 2 in substantially parallel to a lower end portion of the first cover 3 located at the tray position.

As depicted in FIG. 3, a pre-fed-sheet mount portion 11 and a discharged-sheet mount portion 12 may be disposed in the housing 2. The pre-fed-sheet mount portion 11 and the discharged-sheet mount portion 12 may be disposed, one above the other, below the first cover 3 located at the cover position.

Figure 4:
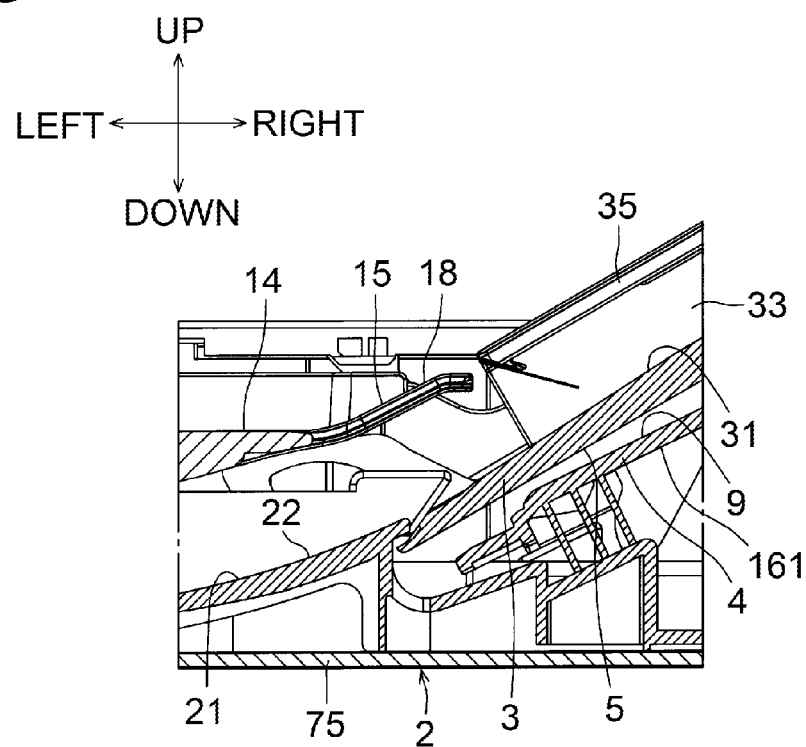
FIG. 4 is a sectional view depicting a pre-fed-sheet mount portion and a vicinity of a right end portion of a discharged-sheet mount portion in the illustrative embodiment according to one or more aspects of the disclosure.

As depicted in FIG. 2, the pre-fed-sheet mount portion 11 may comprise a pre-fed-sheet mount surface 13 that may be exposed by the movement of the first cover 3 from the cover position to the tray position. The pre-fed-sheet mount surface 13 may comprise a horizontal portion 14 and an inclined portion 15. The horizontal portion 14 may be a substantially flat surface that may lie lower than the device upper surface 8 and extend in both the front-rear direction and the right-left direction at a lower level than the upper edge of the housing 2. The inclined portion 15 may be inclined upward to the right from the horizontal portion 14. The inclined portion 15 may have a cutaway portion 16 in its middle portion in the front-rear direction. The inclined portion 15 may be divided into a front inclined portion 17 and a rear inclined portion 18 by the cutaway portion 16. The front inclined portion 17 and the rear inclined portion 18 may have the same width in the front-rear direction. As depicted in FIG. 4, right end portions of the front inclined portion 17 and the rear inclined portion 18 may be curved so as to have more gentle inclination angles, respectively. In FIG. 4, although only the rear inclined portion 18 is depicted, the front inclined portion 17 may also have the same shape.

As depicted in FIG. 2, the pre-fed-sheet mount portion 11 may comprise a pair of pre-fed-sheet guides 19 and 20 on the left of the pre-fed-sheet mount surface 13. The pre-fed-sheet guides 19 and 20 may be spaced apart from each other in the front-rear direction. The pair of pre-fed-sheet guides 19 and 20 may be configured to move closer to and away from each other by the same moving amount with reference to a middle position therebetween.

As depicted in FIG. 3, the discharged-sheet mount portion 12 may be disposed below the pre-fed-sheet mount portion 11. The discharged-sheet mount portion 12 may comprise a discharged-sheet mount surface 21. The discharged-sheet mount surface 21 may extend in both the front-rear direction and the right-left direction below the pre-fed-sheet mount portion 11 while clearance is left below the pre-fed-sheet mount portion 11. A right end portion 22 of the discharged-sheet mount surface 21 may be inclined upward to the right in substantially parallel to the inclined portion 15 of the pre-fed-sheet mount surface 13.

The first cover 3 may comprise a discharged-sheet support surface 31 as a support surface on the other side thereof, wherein the other side may be opposite to the upper surface 5. As depicted in FIG. 2, in a state where the first cover 3 is located at the tray position, discharged-sheet guide portions 32 and 33 may be disposed at a left front end portion and a left rear end portion, respectively, on the discharged-sheet support surface 31. The discharged-sheet guide portions 32 and 33 may be integral with the discharged-sheet support surface 31, thereby being securely fixed to the discharged-sheet support surface 31. The discharged-sheet guide portions 32 and 33 may protrude from the discharged-sheet support surface 31 and extend in the right-left direction. Each of the discharged-sheet guide portions 32 and 33 may have one end that may be fixed to the discharged-sheet support surface 31 and the other end that may be free and opposite to the one end.

The discharged-sheet guide portions 32 and 33 may support pre-fed sheet support portions 34 and 35, respectively. The pre-fed sheet support portions 34 and 35 may be colored in color that may be different from the color of the first cover 3. The pre-fed sheet support portions 34 and 35 may have a plate shape having the same width in the front-rear direction as the front inclined portion 17 and the rear inclined portion 18. The front pre-fed sheet support portion 34 may be supported by the other end of the discharged-sheet guide portion 32 and extend rearward in substantially parallel to the discharged-sheet support surface 31. The rear pre-fed sheet support portion 34 may be supported by the other end of the discharged-sheet guide portion 33 and extend forward in substantially parallel to the discharged-sheet support surface 31.

In a state where the first cover 3 is located at the tray position, the pre-fed sheet support portions 34 and 35 may be located on the right of the front inclined portion 17 and the rear inclined portion 18, respectively. The pre-fed sheet support portions 34 and 35 may be inclined in substantially the same direction as the direction that front inclined portion 17 and the rear inclined portion 18 may extend. As depicted in FIG. 4, a left end portion of the pre-fed sheet support portion 35 may be located at a higher position than the right end portion of the rear inclined portion 18. Likewise, a left end portion of the pre-fed sheet support portion 34 may be located at a higher position than the right end portion of the front inclined portion 17. In a state where the first cover 3 is located at the tray position, a left end portion of the discharged-sheet support surface 31 may be located at a lower position than the right end portion of the discharged-sheet mount surface 21.

As depicted in FIG. 3, a conveyance path 41 as a space may be defined on the left of the pre-fed-sheet mount portion 11 and the discharged-sheet mount portion 12 in the housing 2 and constitute a portion of a conveyor portion in which a sheet S may be conveyed. The conveyance path 41 may have an upper path 42, a lower path 43, and a curved path 44. The upper path 42 may be disposed on a relatively upper side. The lower path 43 may be disposed on a relatively lower side. The curved path 44 may be disposed on the left of the upper path 42 and the lower path 43 and connect the upper path 42 and the lower path 43 to each other. The conveyance path 41 may be defined by various rollers for conveying a sheet S and guide surfaces disposed between the rollers.

A pair of supply rollers 51, a separation roller 52, a separation piece 53, a pair of conveyor rollers 54, an image sensor module 55, a reverse roller 56, following rollers 57 and 58, and a pair of discharge rollers 59 may define the conveyance path 41.

The pair of supply rollers 51 may be disposed at an entrance of the upper path 42. The entrance of the upper path 42 may be disposed on the left of the pre-fed-sheet mount portion 11. One supply roller 51 may be disposed at a relatively higher position and may be rotatable on a rotational axis extending in the front-rear direction. The other supply roller 51 may be disposed at a relatively lower position and may be rotatable on a rotational axis extending in the front-rear direction. A peripheral surface of the upper supply roller 51 and a peripheral surface of the lower supply roller 51 may be in contact with each other, and the contact portion thereof may define a portion of the upper path 42.

The separation roller 52 may be disposed on the left of the upper supply roller 51 and may be rotatable on a rotational axis extending in the front-rear direction.

The separation piece 53 may be disposed below the separation roller 52. The separation piece 53 may be in contact with a peripheral surface of the separation roller 52 from below, and the contact portion thereof may define a portion of the upper path 42.

The pair of conveyor rollers 54 may be disposed on the left of the separation roller 52. One conveyor roller 54 may be disposed at a relatively higher position and may be rotatable on a rotational axis extending in the front-rear direction. The other conveyor roller 54 may be disposed at a relatively lower position and may be rotatable on a rotational axis extending in the front-rear direction. A peripheral surface of the upper conveyor roller 54 and a peripheral surface of the lower conveyor roller 54 may be in contact with each other, and the contact portion thereof may define a portion of the upper path 42.

The image sensor module 55 may be disposed on the left of the lower conveyor roller 54. The image sensor module 55 may comprise therein, for example, a light source, lenses, and an image sensor. A contact glass 60 may be disposed on an upper surface of the image sensor module 55. The upper surface of the contact glass 60 and a guide surface that may face the upper surface of the contact glass 60 may define a portion of the upper path 42 therebetween.

The reverse roller 56 may be disposed on the left of the image sensor module 55. The reverse roller 56 may be rotatable on a rotational axis extending in the front-rear direction. A left peripheral surface of the reverse roller 56 and a curved guide surface that may face the left peripheral surface of the reverse roller 56 with being spaced apart therefrom at a predetermined interval may define a portion of the curved path 44 therebetween.

The following roller 57 may be disposed above the reverse roller 56. The following roller 57 may be rotatable on a rotational axis extending in the front-rear direction. A portion of a peripheral surface of the following roller 57 may be in contact with the peripheral surface of the reverse roller 56, and the contact portion thereof may define a portion of the curved path 44.

The following roller 58 may be disposed on the lower left of the reverse roller 56. The following roller 58 may be rotatable on a rotational axis extending in the front-rear direction. A portion of a peripheral surface of the following roller 58 may be in contact with the peripheral surface of the reverse roller 56, and the contact portion thereof may define a portion of the curved path 44.

The pair of discharge rollers 59 may be disposed at an exit of the lower path 43. The exit of the lower path 43 may be disposed on the left of the discharged-sheet mount portion 12 and spaced apart from the left end portion of the discharged-sheet mount surface 21. One discharge roller 59 may be at a relatively higher position and may be rotatable on a rotational axis extending in the front-rear direction. The other discharge roller 59 may be disposed at a relatively lower position and may be rotatable on a rotational axis extending in the front-rear direction. A peripheral surface of the upper discharge roller 59 and a peripheral surface of the lower discharge roller 59 may be in contact with each other, and the contact portion thereof may define a portion of the lower path 43.

<Image Reading Operation>

As depicted in FIG. 2, the positions of the pair of pre-fed-sheet guides 19 and 20 may be adjusted in accordance with a width of a sheet S to be read in the right-left direction. One or more sheets S may be placed with spreading over the pre-fed-sheet mount surface 13 and the pre-fed sheet support portions 34 and 35 while leading edge portions of the one or more sheets S are inserted between the pre-fed-sheet guides 19 and 20.

As an instruction to start reading an image from one or more sheets S, the pair of supply rollers 51 is issued, the separation roller 52, the separation piece 53, the pair of conveyor rollers 54, the reverse roller 56, the following rollers 57 and 58, and the pair of discharge rollers 59 may start rotating. By the rotation of the supply roller 51, a conveyance force may be applied to the one or more sheets S from the supply roller 51, and thus the one or more sheets S may be conveyed in the upper path 42 toward the separation roller 52. As the one or more sheets S reach the contact portion at which the separation roller 52 and the separation piece 53 contact each other, the one or more sheets S may be drawn into between the separation roller 52 and the separation piece 53, and thus the one or more sheets S may be separated into one sheet S. Then, the one separated sheet S may pass the separation roller 52 and the separation piece 53.

Thereafter, as the sheet S reaches the contact portion at which the conveyor rollers 54 contact each other, a conveyance force may be applied to the sheet S from the conveyor rollers 54, and thus the sheet S may be further conveyed in the upper path 42. By this conveyance, the sheet S may pass over the contact glass 60 of the image sensor module 55, and thus, may reach the contact portion at which the reverse roller 56 and the following roller 57 may contact each other. While the sheet S passes over the contact glass 60, the image sensor module 55 may read an image from one side of the sheet S.

After the sheet S reaches the contact portion at which the reverse roller 56 and the following roller 57 contact each other, the sheet S may be conveyed in the curved path 44. Then, the sheet S may pass between the reverse roller 56 and the following roller 58 and enter the lower path 43 from the curved path 44. A conveyance direction of the sheet S may be reversed while the sheet S is conveyed in the curved path 44.

An entrance of the lower path 43 may be open downward in the lower surface of the housing 2. The housing 2 may be united to a multifunction peripheral (not depicted) from above. The multifunction peripheral may comprise, for example, an image forming unit that may be accommodated therein. A contact glass 301 may be disposed on an upper surface of the image forming unit for supporting a sheet S to be read. An image sensor module 302 that may be movable in the right-left direction may be disposed below the contact glass 301. The image sensor module 302 may comprise therein, for example, a light source, lenses, and an image sensor. At the time of reading a moving sheet S, the image sensor module 302 may move to a predetermined stationary position. The sheet S may pass over the contact glass 301 to enter the lower path 43 from the curved path 44. As the sheet S passes over the contact glass 301, the image sensor module 302 located at the stationary position may read an image from the other side of the sheet S.

As the sheet S reaches the contact portion at which the discharge rollers 59 contact each other, a conveyance force may be applied to the sheet S from the discharge rollers 59, and thus the sheet S may be discharged from the exit of the lower path 43.

The discharged sheet S may move on the discharged-sheet mount surface 21 toward the discharged-sheet support surface 31 of the first cover 3. Depending on a size of the sheet S, as the sheet S approaches the discharged-sheet support surface 31, one or both edges of the sheet S in the front-rear direction may come into contact with one or both of the discharged-sheet guide portions 32 and 33. Then, the one or both edges of the sheet S in the front-rear direction may slide over the one or both of the discharged-sheet guide portions 32 and 33 in accordance with the movement of the sheet S on the discharged-sheet support surface 31, thereby correcting alignment of the sheet S. As the sheet S is released from the discharge rollers 59, the sheet S may be placed while spreading over the discharged-sheet mount surface 21 and the discharged-sheet support surface 31.

<Housing>

Figure 5:
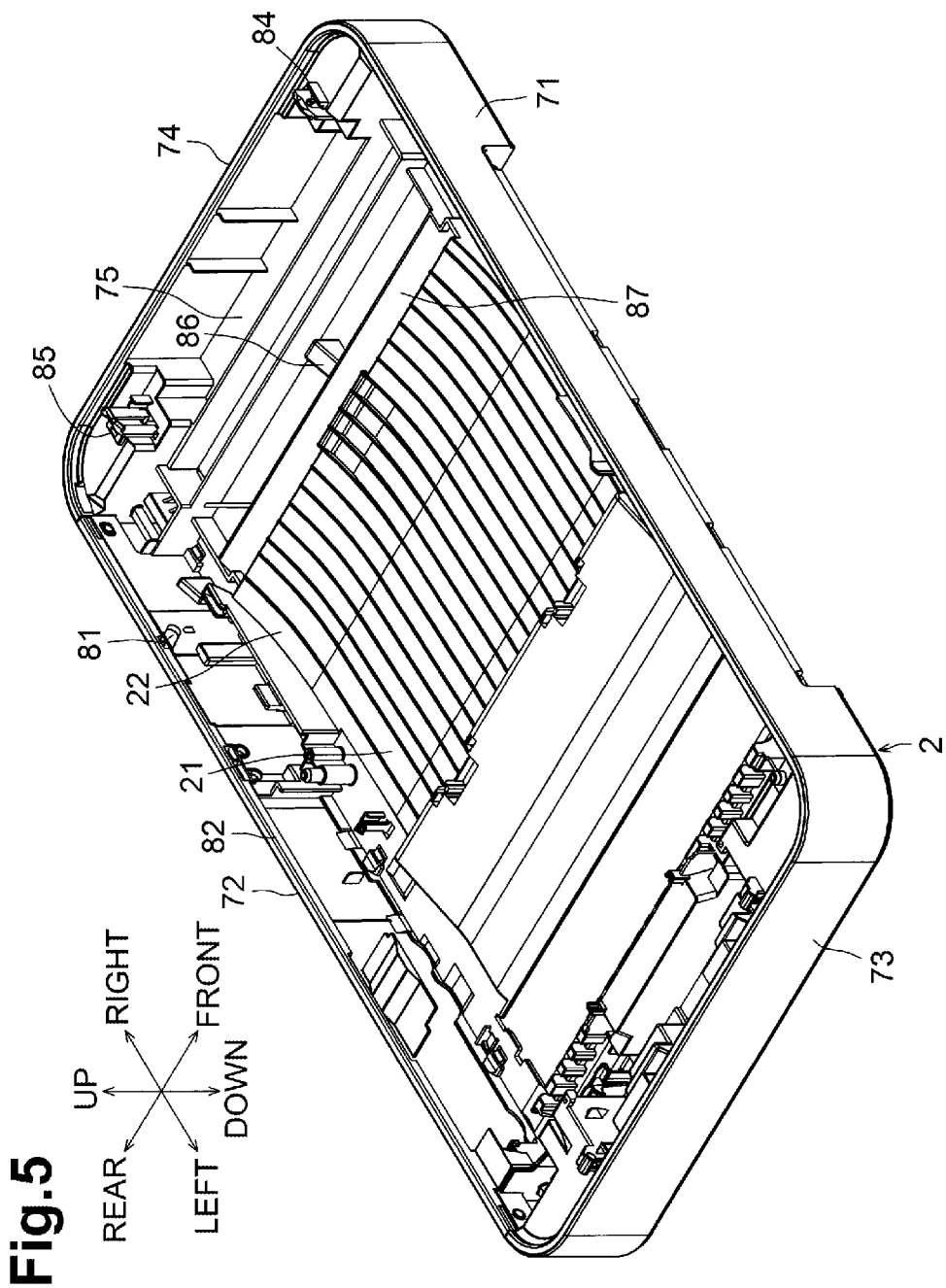
FIG. 5 is a perspective view depicting a housing in the illustrative embodiment according to one or more aspects of the disclosure.

As depicted in the example shown in FIG. 5, the housing 2 may comprise a front side-plate 71, a rear side-plate 72, a left side-plate 73, a right side-plate 74, and a bottom plate 75.

The front side-plate 71 and the rear side-plate 72 as examples of a side wall may be spaced apart from each other in the front-rear direction. The front side-plate 71 and the rear side-plate 72 may extend in parallel to each other in the right-left direction. The rear side-plate 72 may have a groove 81 in its inner surface at a position deviated to the right with respect to a middle position in the rear side-plate 72 in the right-left direction. The groove 81 may be recessed rearward from the inner surface of the rear side-plate 72 and have no upper end. The groove 81 may extend downward to the right. The inner surface of the rear side-plate 72 may comprise a stepped portion having a surface 82 at a position lower than an upper end surface of the rear side-plate 72. In a state where the first cover 3 is located at the cover position, a lower end of the first cover 3 may be in contact with the surface 82.

The front side-plate 71 may have a groove (not depicted) in its inner surface. The groove of the front side-plate 71 may have a shape that may be symmetrical to the shape of the groove 81. The inner surface of the front side-plate 71 may also comprise a stepped portion having a surface at a position lower than the upper end surface of the front side-plate 71. In the description below, the groove and the surface of the front side-plate 71 may be assigned the same reference numerals, respectively, as the groove 81 and the surface 82 of the rear side-plate 72.

The left side-plate 73 and the right side-plate 74 may be spaced apart from each other in the right-left direction. The left side-plate 73 and the right side-plate 74 may extend in parallel to each other in the front-rear direction. The left side-plate 73 may be connected to left end portions of the front side-plate 71 and the rear side-plate 72. The right side-plate 74 may be connected to right end portions of the front side-plate 71 and the rear side-plate 72.

The bottom plate 75 as an example of a base portion may disposed at lower ends of the front side-plate 71, the rear side-plate 72, the left side-plate 73, and the right side-plate 74 to connect therebetween. The discharged-sheet mount surface 21 may be defined on an upper surface of the bottom plate 75.

A pair of bearing portions 84 and 85 may be disposed at a right end portion of the upper surface of the bottom plate 75. The bearing portions 84 and 85 may be spaced apart from each other in the front-rear direction. The front bearing portion 84 may be a recess that may be recessed rearward. The rear bearing portion 85 may be a recess that may be recessed forward.

A contact portion 86 and a stopper 87 may be disposed on the right of the discharged-sheet mount surface 21 and may protrude from the upper surface of the bottom plate 75. The stopper 87 may be disposed between the discharged-sheet mount surface 21 and the contact portion 86.

<First Cover>

Figure 6:
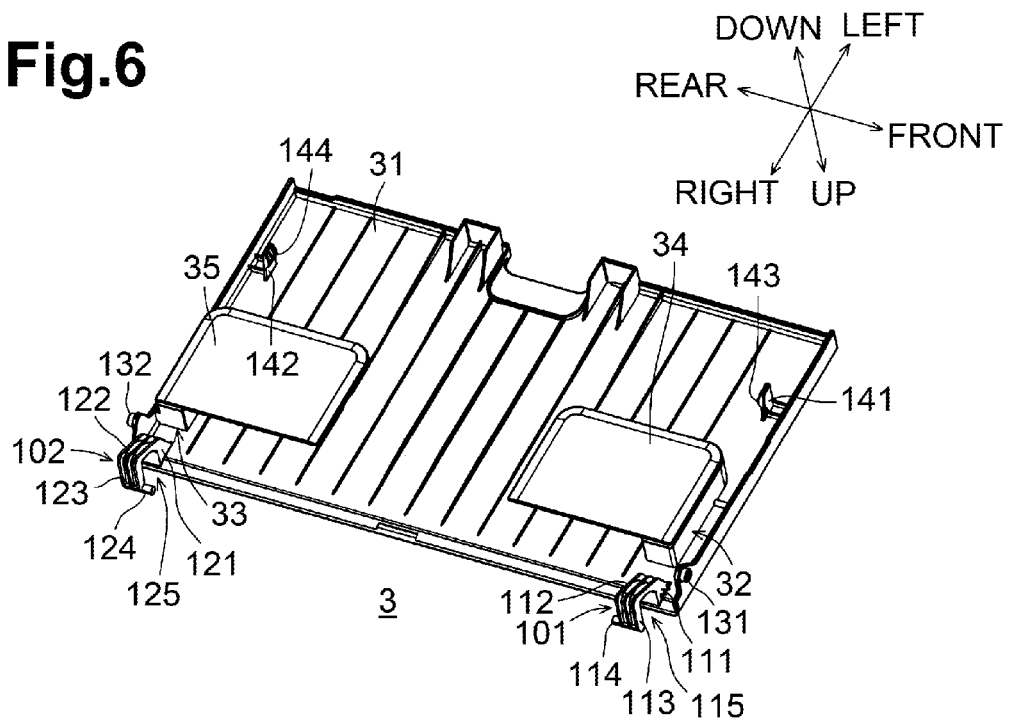
FIG. 6 is a perspective view depicting a discharged-sheet mount surface of the first cover in the illustrative embodiment according to one or more aspects of the disclosure.
Figure 7:
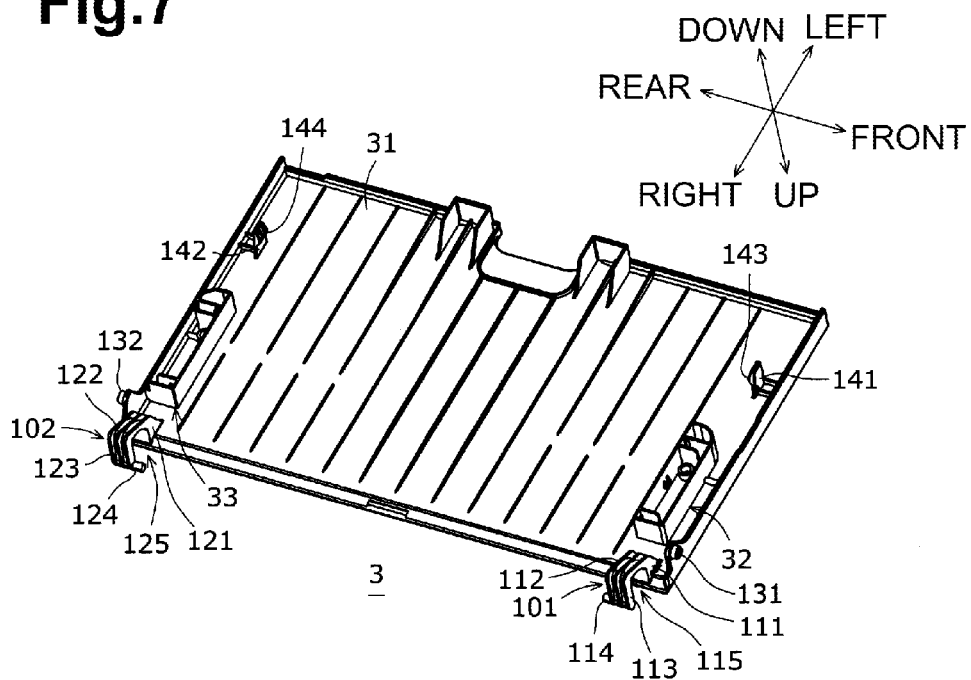
FIG. 7 is a perspective view depicting the discharged-sheet mount surface of the first cover in the illustrative embodiment according to one or more aspects of the disclosure, wherein pre-fed sheet support portions are removed from the first cover.
Figure 8:
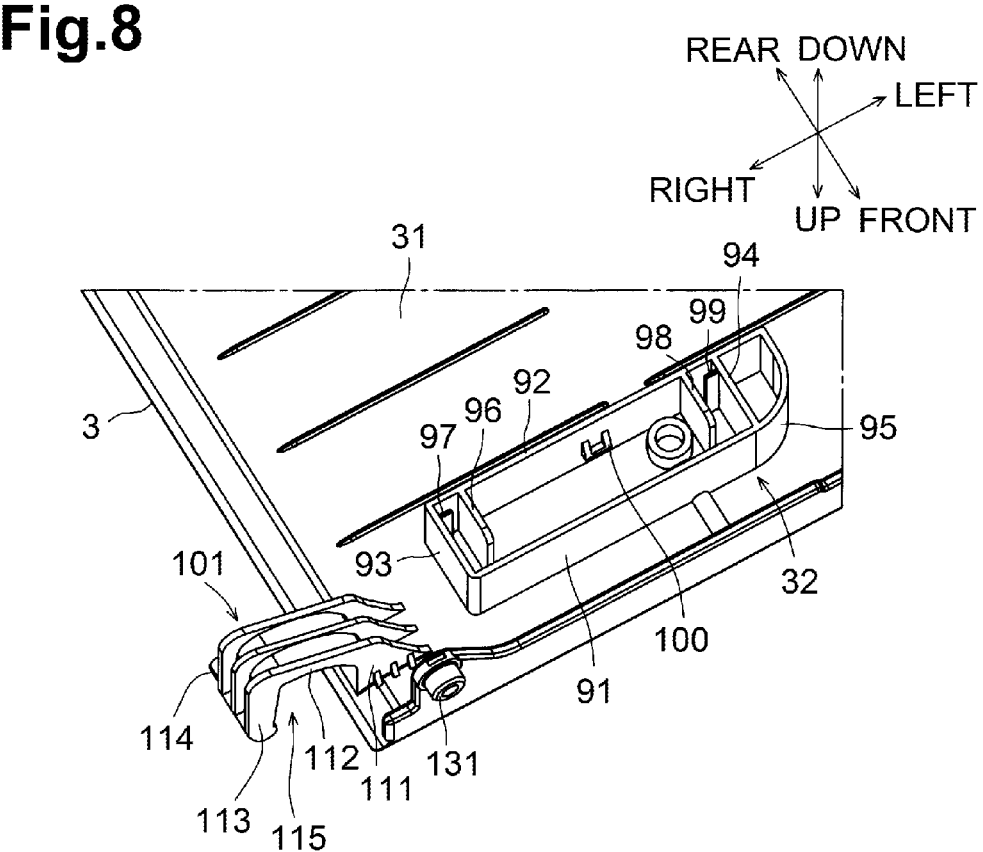
FIG. 8 is a perspective view depicting a portion of the discharged-sheet mount surface of the first cover in the illustrative embodiment according to one or more aspects of the disclosure.

Hereinafter, in a description of the first cover 3, the directions of up, down, right, left, front, and rear may be defined with reference to an orientation of the first cover 3 that may be located at the cover position (see FIG. 1). FIGS. 6, 7, and 8 each depict the upside-down first cover 3 that is removed from the housing 2.

The discharged-sheet guide portions 32 and 33 may protrude from a right front end portion and a right rear end portion, respectively, of the discharged-sheet mount surface 21. Shapes of the front and rear discharged-sheet guide portions 32 and 33 may be symmetrical to each other. Therefore, a description of a configuration of the front discharged-sheet guide portion 32 is presented below but a description of a configuration the rear discharged-sheet guide portion 33 is omitted.

As depicted in FIG. 8, the discharged-sheet guide portion 32 may comprise a first wall portion 91, a second wall portion 92, a third wall portion 93, a fourth wall portion 94, a fifth wall portion 95, a sixth wall portion 96, a seventh wall portion 97, an eighth wall portion 98, and a ninth wall portion 99 that may be integral with each other. The wall portions 91 to 99 may protrude from the discharged-sheet support surface 31.

The first wall portion 91 and the second wall portion 92 may be spaced apart from each other in the front-rear direction. The first wall portion 91 and the second wall portion 92 may extend in parallel to each other in the right-left direction. The second wall portion 92 may extend to the left beyond the first wall portion 91. A protrusion 100 may be disposed on a surface of the second wall portion 92, wherein the surface may face the first wall portion 91. The protrusion 100 may protrude from substantially a middle position of the surface of the second wall portion 92 in the right-left direction.

The third wall portion 93 may be connected to right end portions of the first wall portion 91 and the second wall portion 92 and extend in the front-rear direction.

The fourth wall portion 94 may be connected to a left end portion of the first wall portion 91 and a portion between both ends of the second wall portion 92 in the right-left direction and extend in the front-rear direction.

The fifth wall portion 95 may be connected to the left end portions of the first wall portion 91 and the second wall portion 92 and may be curved forward to the left.

The sixth wall portion 96 may be disposed while clearance is left on the left of the third wall portion 93. The sixth wall portion 96 may extend in parallel to the third wall portion 93 in the front-rear direction. A rear end of the sixth wall portion 96 may be connected to the second wall portion 92. Clearance may be left between the front end of the sixth wall portion 96 and the first wall portion 91.

The seventh wall portion 97 may be disposed between the third wall portion 93 and the sixth wall portion 96. The seventh wall portion 97 may extend in parallel to the second wall portion 92 in the right-left direction while being spaced apart from the second wall portion 92. A right end of the seventh wall portion 97 may be connected to the third wall portion 93. Clearance may be left between a left end of the seventh wall portion 97 and the sixth wall portion 96.

The eighth wall portion 98 may be disposed while clearance is left on the right of the fourth wall portion 94. The eighth wall portion 98 may extend in parallel to the fourth wall portion 94 in the front-rear direction. A rear end of the eighth wall portion 98 may be connected to the second wall portion 92. Clearance may be left between a front end of the eighth wall portion 98 and the first wall portion 91.

The ninth wall portion 99 may be disposed between the fourth wall portion 94 and the eighth wall portion 98. The ninth wall portion 99 may extend in parallel to the second wall portion 92 while being spaced apart from the second wall portion 92. A left end of the ninth wall portion 99 may be connected to the fourth wall portion 94. Clearance may be left between a left end of the ninth wall portion 99 and the eighth wall portion 98.

As depicted in FIGS. 6 and 7, arms 101 and 102 may be disposed at a right front end portion and a right rear end portion, respectively, in the first cover 3.

The front arm 101 may comprise a projecting portion 111, an extended portion 112, a distal end portion 113, and a boss 114 that may be integral with each other. The projecting portion 111 may protrude from the discharged-sheet support surface 31. The extended portion 112 may extend rightward from a lower end of the projecting portion 111. The distal end portion 113 may extend upward from a right end of the extended portion 112. The boss 114 may protrude rearward from the distal end portion 113. Such a shape may provide the arm 101 with a recess 115 between the projecting portion 111 and the distal end portion 113.

The rear arm 102 may have a shape that may be symmetrical to the shape of the front arm 101. More specifically, the rear arm 102 may comprise a projecting portion 121, an extended portion 122, a distal end portion 123, and a boss 124 that may be integral with each other. The projecting portion 121 may protrude from the discharged-sheet support surface 31. The extended portion 122 may extend rightward from a lower end of the projecting portion 121. The distal end portion 123 may extend upward from a right end of the extended portion 122. The boss 124 may protrude forward from the distal end portion 123. Such a shape may provide the arm 102 with a recess 125 between the projecting portion 121 and the distal end portion 123.

The first cover 3 may further comprise a plurality of, for example, two, shafts 131 and 132. The shafts 131 and 132 may be disposed on the same line extending in the front-rear direction. The shaft 131 may protrude forward from a right end portion of a front surface of the first cover 3. The shaft 132 may protrude rearward from a right end portion of a rear surface of the first cover 3.

The first cover 3 may further comprise a plurality of, for example, two, stopper protrusions 141 and 142. The stopper protrusions 141 and 142 may protrude from a left front end portion and a left rear end portion, respectively, of the discharged-sheet support surface 31. The stopper protrusions 141 and 142 may be disposed at the same position in the right-left direction. The front stopper protrusion 141 may comprise a projecting portion 143 at its distal end portions. The projecting portion 143 may protrude rearward therefrom. The rear stopper protrusion 142 may comprise a projecting portion 144 at its distal end portions. The projecting portion 144 may protrude forward therefrom.

<Pre-Fed Sheet Support Portions>

Hereinafter, in the description of the pre-fed sheet support portions 34 and 35, the directions of up, down, right, left, front, and rear may be defined with reference to the orientation of the first cover 3 that may be located at the cover position (see FIG. 1).

Shapes of the front and rear pre-fed sheet support portions 34 and 35 may be symmetrical to each other. Therefore a description of a configuration of the front pre-fed sheet support portion 34 is presented below but a description of a configuration of the rear pre-fed sheet support portion 35 is omitted.

Figure 9:
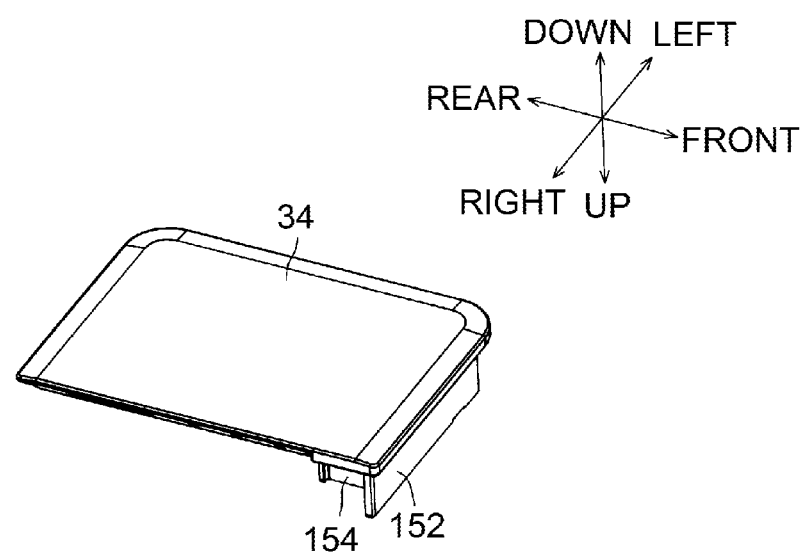
FIG. 9 is a perspective view depicting one of the pre-fed sheet support portions in the illustrative embodiment according to one or more aspects of the disclosure.
Figure 10:
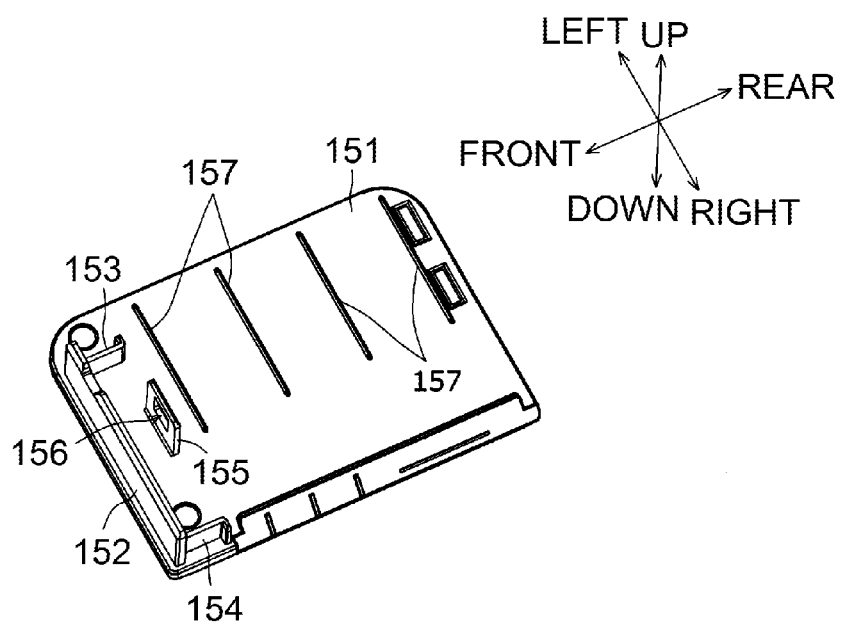
FIG. 10 is a perspective view depicting one surface, facing a sheet discharge guide portion, of one of the pre-fed sheet support portion in the illustrative embodiment according to one or more aspects of the disclosure.

As depicted in FIGS. 9 and 10, the pre-fed sheet support portion 34 may comprise a first insertion wall portion 152, a second insertion wall portion 153, a third insertion wall portion 154, and a stopper wall portion 155 on its surface 151 that may be opposite to the surface on which a pre-fed sheet S (see FIG. 2) may be placed.

The first insertion wall portion 152 may protrude from a front end portion of the surface 151. The first insertion wall portion 152 may extend across substantially a width of the surface 151 in the right-left direction.

The second insertion wall portion 153 may be disposed behind a left end portion of the first insertion wall portion 152 in a protruding manner. The second insertion wall portion 153 may extend rearward from the first insertion wall portion 152, bent and further extend leftward.

The third insertion wall portion 154 may be disposed behind a right end portion of the first insertion wall portion 152 in a protruding manner. The third insertion wall portion 154 may extend rearward from the first insertion wall portion 152, bent and further extend rightward.

The stopper wall portion 155 may be disposed between the second insertion wall portion 153 and the third insertion wall portion 154. The stopper wall portion 155 may be spaced apart from the first insertion wall portion 152 in the front-rear direction, and extend in parallel to the first insertion wall portion 152 in the right-left direction. The stopper wall portion 155 may have a stopper hole 156 that may pass therethrough in the front-rear direction.

To attach the pre-fed sheet support portion 34 to the discharged-sheet guide portion 32, the first insertion wall portion 152 may be inserted into a space defined by the first wall portion 91, the eighth wall portion 98, and the sixth wall portion 96 of the discharged-sheet guide portion 32. An rearward extended portion of the second insertion wall portion 153 may be inserted into a space defined by the eighth wall portion 98 and the ninth wall portion 99 of the discharged-sheet guide portion 32. A leftward extended portion of the second insertion wall portion 153 may be inserted into a space defined by the second wall portion 92 and the ninth wall portion 99 of the discharged-sheet guide portion 32. A rearward extended portion of the third insertion wall portion 154 may be inserted into a space defined by the sixth wall portion 96 and the seventh wall portion 97 of the discharged-sheet guide portion 32. A rightward extended portion of the third insertion wall portion 154 may be inserted into a space defined by the second wall portion 92 and the seventh wall portion 97 of discharged-sheet guide portion 32. The protrusion 100 of the discharged-sheet guide portion 32 may be caught in the stopper hole 156 of the stopper wall portion 155 from behind, whereby the stopper wall portion 155 and the protrusion 100 may be engaged with each other. Thus, the attachment of the pre-fed sheet support portion 34 to the discharged-sheet guide portion 32 may be implemented. In a state where the pre-fed sheet support portion 34 is attached on the discharged-sheet guide portion 32, lower ends of the first wall portion 91, the second wall portion 92, the third wall portion 93, the fourth wall portion 94, the fifth wall portion 95, the sixth wall portion 96, and the eighth wall portion 98 of the discharged-sheet guide portion 32 may be in contact with the surface 151 of the pre-fed sheet support portion 34.

The pre-fed sheet support portion 34 may comprise a plurality of ribs 157 on the surface 151. The plurality of ribs 157 may protrude from the surface 151 and extend in the right-left direction.

<Second Cover>

Figure 11:
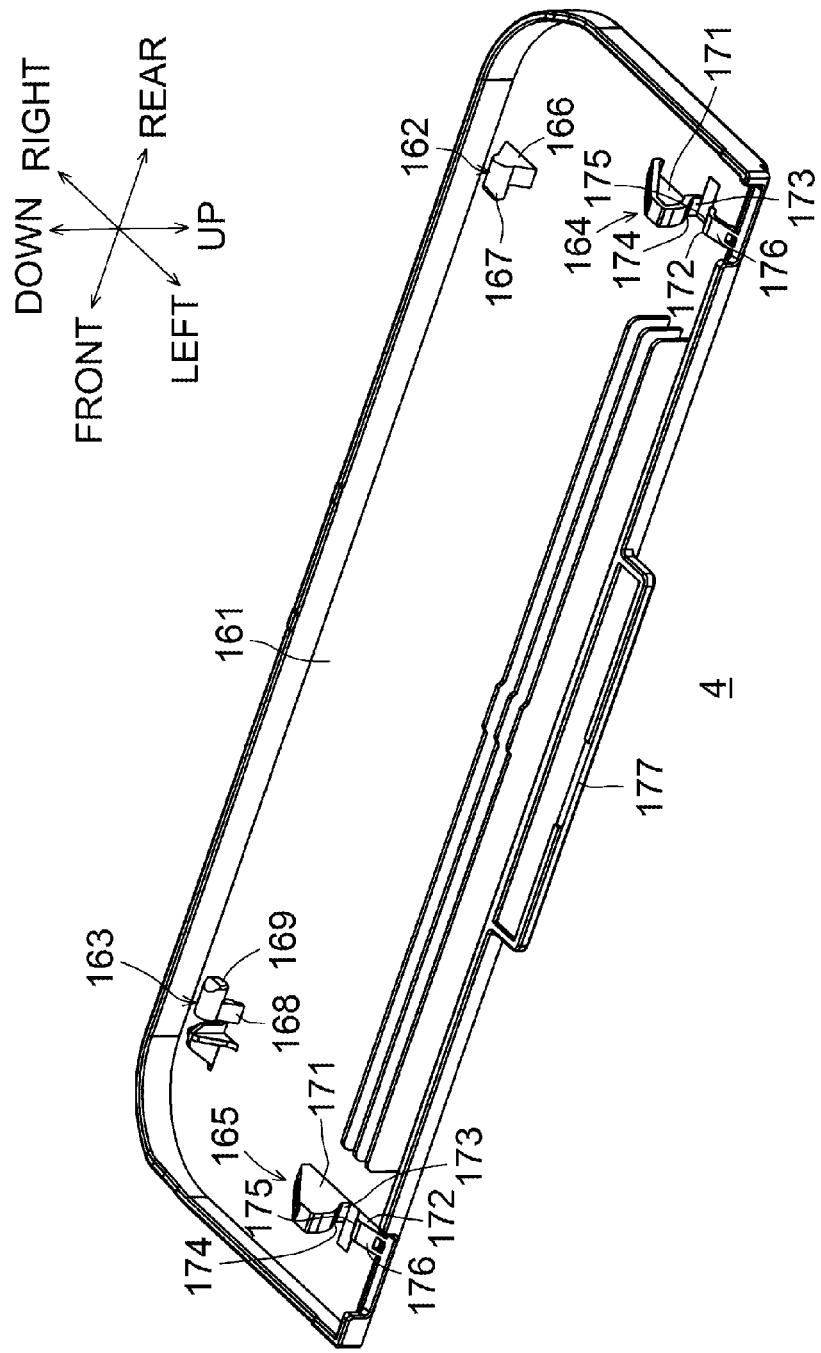
FIG. 11 is a perspective view depicting a lower surface of a second cover in the illustrative embodiment according to one or more aspects of the disclosure.

Hereinafter, in a description of the second cover 4, the directions of up, down, right, left, front, and rear may be defined with reference to the orientation of the first cover 3 that may be located at the cover position (see FIG. 1). FIG. 11 depicts the upside-down second cover 4 that is removed from the housing 2.

The second cover 4 may comprise a plurality of, for example, two, swing shaft portions 162 and 163 and a plurality of, for example, two, catch portions 164 and 165 on its lower surface 161 that may be opposite to the upper surface 9 (see FIG. 1).

The swing shaft portions 162 and 163 as an example of a swing shaft may be disposed on a right end portion of the lower surface 161 and spaced apart from each other in the front-rear direction. The rear swing shaft portion 162 may comprise a protruding portion 166 and a shaft 167 that may be integral with each other. The protruding portion 166 may protrude from the lower surface 161. The shaft 167 may protrude forward from the protruding portion 166. The front swing shaft portion 163 may have a symmetrical configuration to that of the rear swing shaft portion 162. That is, the front swing shaft portion 163 may comprise a protruding portion 168 and a shaft 169 that may be integral with each other. The protruding portion 168 may protrude from the lower surface 161. The shaft 169 may protrude rearward from the protruding portion 168.

The catch portions 164 and 165 may be disposed at a left end portion of the lower surface 161 and spaced apart from each other in the front-rear direction. The catch portions 164 and 165 may comprise an acting portion 171 and a lead-in portion 172.

The acting portion 171 may protrude from the lower surface 161. The acting portion 171 may comprise a wall portion 173 and a pressed portion 174. The wall portion 173 may protrude from the lower surface 161 perpendicular to the lower surface 161. The pressed portion 174 may extend inclinatory downward to the left from a lower end of the wall portion 173.

The lead-in portion 172 may be disposed on the left of the acting portion 171. The lead-in portion 172 may comprise a first inclined surface 175 and a second inclined surface 176. The first inclined surface 175 may be inclined downward to the left from the lower surface 161. The second inclined surface 176 may be inclined upward to the left from a lower end of the first inclined surface 175. A space may be left between the first inclined surface 175 and the pressed portion 174 of the acting portion 171. A size of the space therebetween may be substantially the same as a diameter of each of the bosses 114 and 124. The second inclined surface 176 may extend to a left edge of the second cover 4.

The second cover 4 may comprise a plate-shaped projecting portion 177. The projecting portion 177 may protrude leftward from a middle portion of the left edge of the second cover 4.

<Interlock Mechanism>

Figure 12:
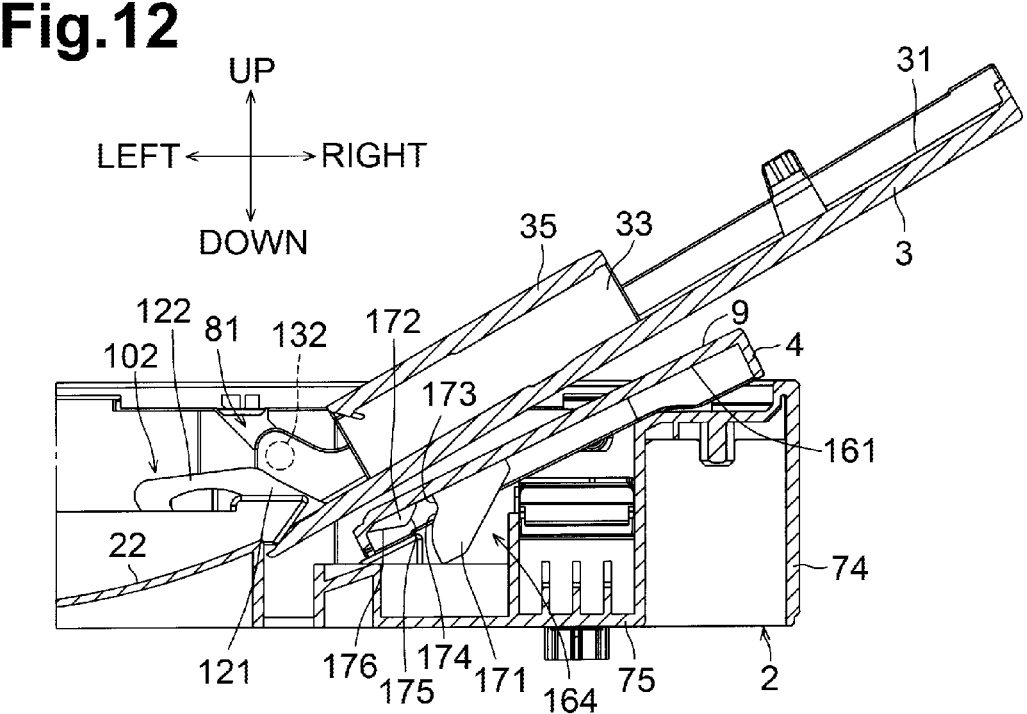
FIG. 12 is a sectional view of a right end portion of the image reading device in the illustrative embodiment according to one or more aspects of the disclosure, wherein the first cover is located at the tray position and the second cover is located at a lower position.

In the example depicted in FIG. 12, the first cover 3 may be pivotably supported by the housing 2 while the shafts 131 and 132 are engaged in the respective grooves 81 in the housing 2.

The second cover 4 may be pivotably supported by the housing 2 while the shafts 167 and 169 (see FIG. 11) are engaged in the respective bearing portions 84 and 85 of the housing 2 (see FIG. 5).

As noted above, the image processing device 1 includes an interlock mechanism that has a first engagement member extending from one of the first or second covers 3, 4. In some implementations, the first engagement member includes one or more arms extending from the first cover part 3. In the illustrated embodiment, the first engagement member includes the arms 101, 102 each having the boss 114, 124 extending therefrom. In the illustrated version, the bosses 114,124 extend inwards towards one another. The second engagement member extends from the second cover 4 and includes, for example, one or more of the catch portions 164 and 165 on its second or lower surface 161 opposite to the first or upper surface 9 (see FIG. 1).

Figure 13:
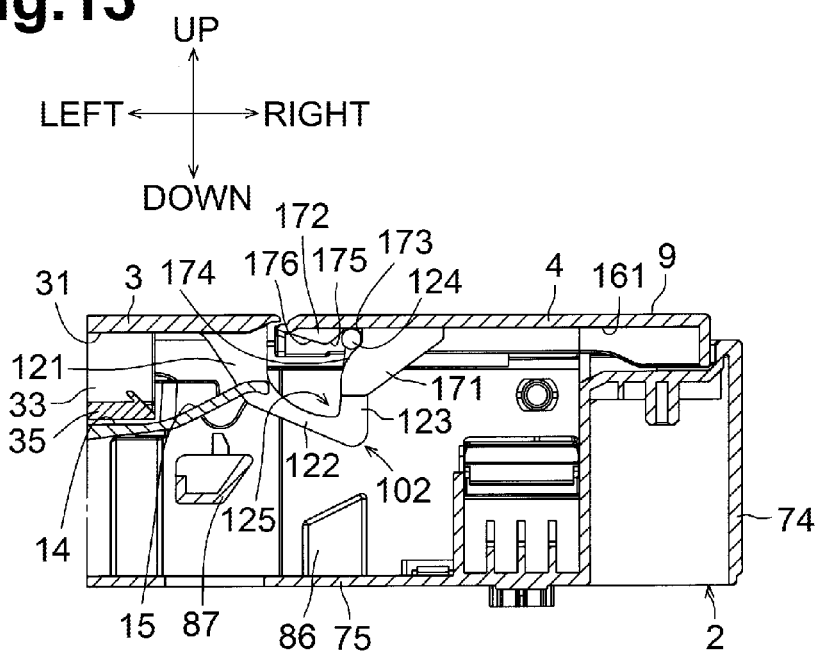
FIG. 13 is a sectional view of the right end portion of the image reading device in the illustrative embodiment according to one or more aspects of the disclosure, wherein the first cover is located at the cover position and the second cover is located at a higher position.
Figure 14A:
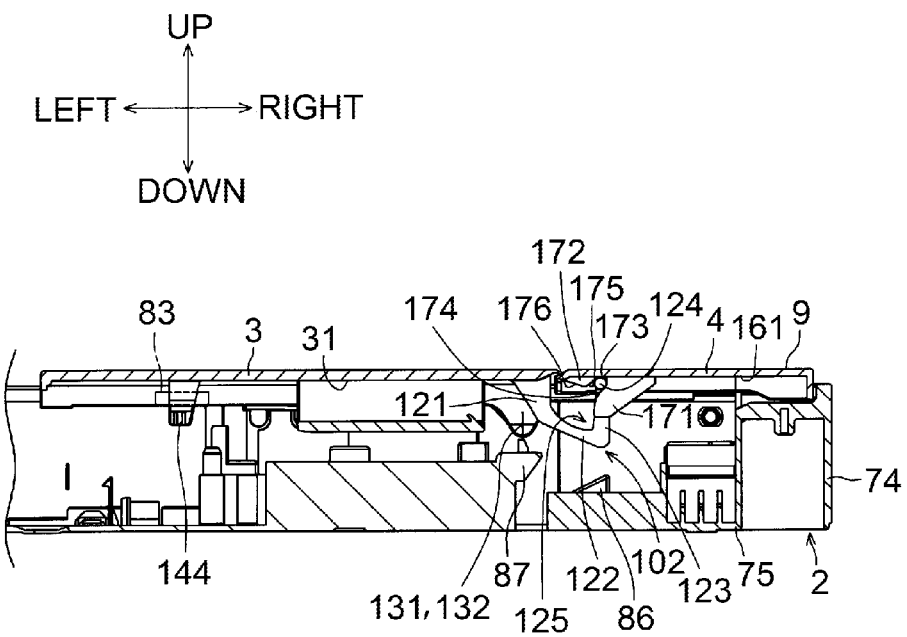
FIG. 14A is a sectional view of the right end portion of the image reading device in the illustrative embodiment according to one or more aspects of the disclosure, wherein locations of shafts and a boss are depicted in a state where the first cover is located at the cover position and the second cover is located at the higher position.
Figure 14B:
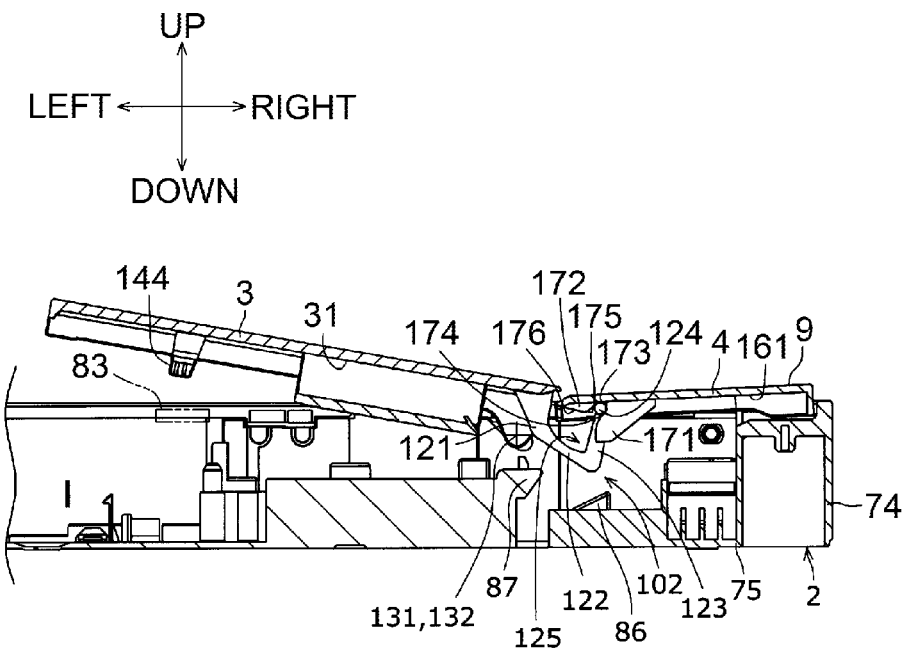
FIG. 14B is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14A.

In a state where the first cover 3 is located at the first, or cover position and the second cover 4 is located at the first, or higher position as depicted in FIGS. 13 and 14A, the boss 124 of the arm 102 of the first cover 3 may be located between the rear acting portion 171 and the rear lead-in portion 172 of the second cover 4 and be in contact with the lower surface 161 of the second cover 4. Similar to the boss 124 of the rear arm 102, the boss 114 of the front arm 101 may be located between the front acting portion 171 and the front lead-in portion 172 of the second cover 4 and be in contact with the lower surface 161 of the second cover 4. The shafts 131 and 132 may be located on lower ends of the grooves 81, respectively. As depicted in FIG. 1, the projecting portion 177 of the second cover 4 may be located below the first cover 3. As depicted in FIG. 13, the pre-fed sheet support portions 34 and 35 may be accommodated between the first cover 3 and the horizontal portion 14 of the pre-fed-sheet mount surface 13.

As indicated by a double-dotted and dashed line in FIG. 14A, stopper portions 83 may be disposed at a front end portion and a rear end portion, respectively, in the housing 2. The stopper portions 83 may be disposed at a substantially middle position in the housing 2 in the right-left direction. Each stopper portion 83 may have a thickness in the front-rear direction and extend in the right-left direction. For example, a member that may extend in the up-down direction with its upper end portion being bent and extending forward may be disposed at a substantially middle portion of the front end portion in the right-left direction in the housing 2. The upper end portion of the member may serve as the front stopper portion 83. Further, a member that may extend in the up-down direction with its upper end portion being bent and extending rearward may be disposed at a substantially middle portion of the rear end portion in the right-left direction in the housing 2. The rear end portion of the member may serve as the rear stopper portion 83. In a state where the first cover 3 is located at the cover position, the projecting portion 143 of the stopper protrusion 141 and the projecting portion 144 of the stopper protrusion 142 of the first cover 3 may be located under the front and rear stopper portions 83, respectively, and thus, the projecting portions 143 and 144 may be caught by the respective stopper portions 83 in the engaged state.

As the first cover 3 moves toward the tray position in the state where the first cover 3 is located at the cover position and the second cover 4 is located at the higher position, the first and second engagement members engage one another. More specifically, in the illustrated example, the bosses 114 and 124 of the first engagement member may press the pressed portions 174 of the acting portions 171 of the second engagement member downward, respectively. In accordance with the downward pressing, the second cover 4 may pivot on the shafts 167 and 169 to tilt downward to the left and thus the left end portion of the second cover 4 may come into the recesses 115 and 125, respectively, defined in the respective arms 101 and 102. The recess 115 may be disposed between one of the wall portions 173 and the shaft 131 and the recess 125 may be disposed between the other of the wall portions 173 and the shaft 132 in front view. In accordance with the pivoting of the second cover 4, the wall portions 173 of the acting portions 171 may press the respective bosses 114 and 124 leftward, thereby moving the shafts 131 and 132 of the first cover 3 upward to the left within the respective grooves 81. In accordance with the movement of the first cover 3 from the tray position, the stopper protrusions 141 and 142 may be deformed elastically and the projecting portions 143 and 144 may be released from the respective stopper portions 83.

Figure 14C:
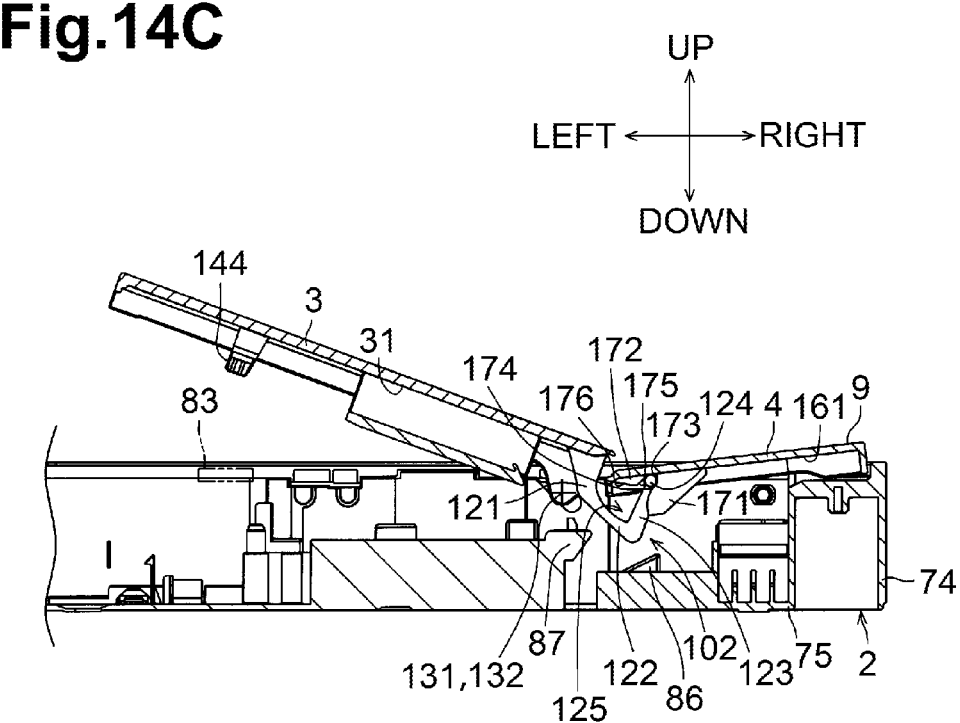
FIG. 14C is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14B.
Figure 14D:
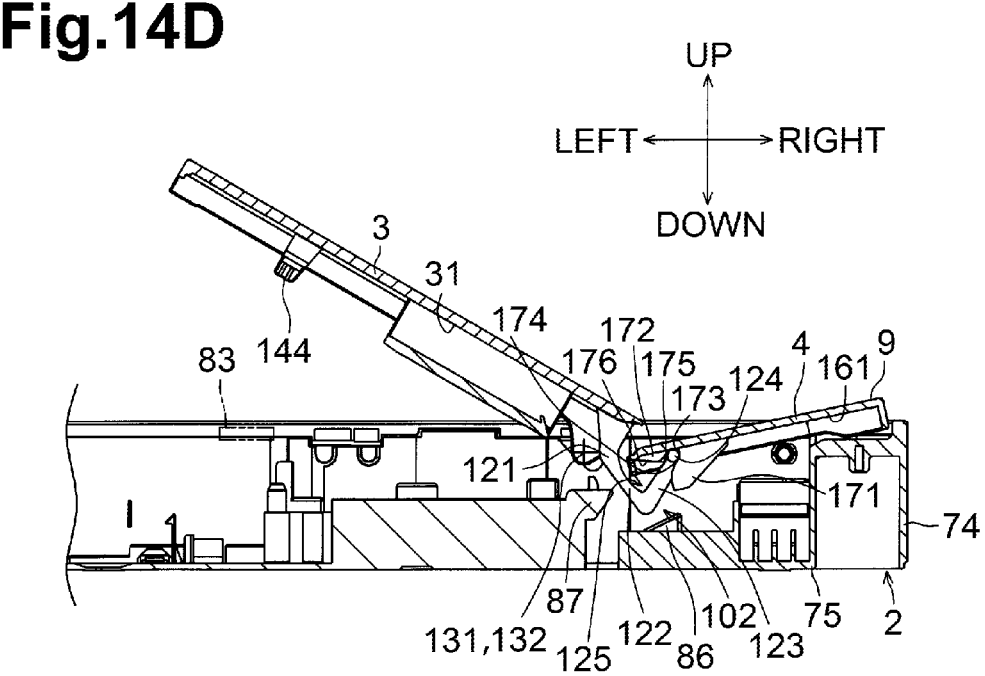
FIG. 14D is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14C.

Thereafter, as depicted in FIGS. 14C and 14D, as the first cover 3 further pivots toward the tray position, the second cover 4 may tilt more and more from the higher position and the shafts 131 and 132 of the first cover 3 may move further upward to the left in the respective grooves 81.

Figure 14E:
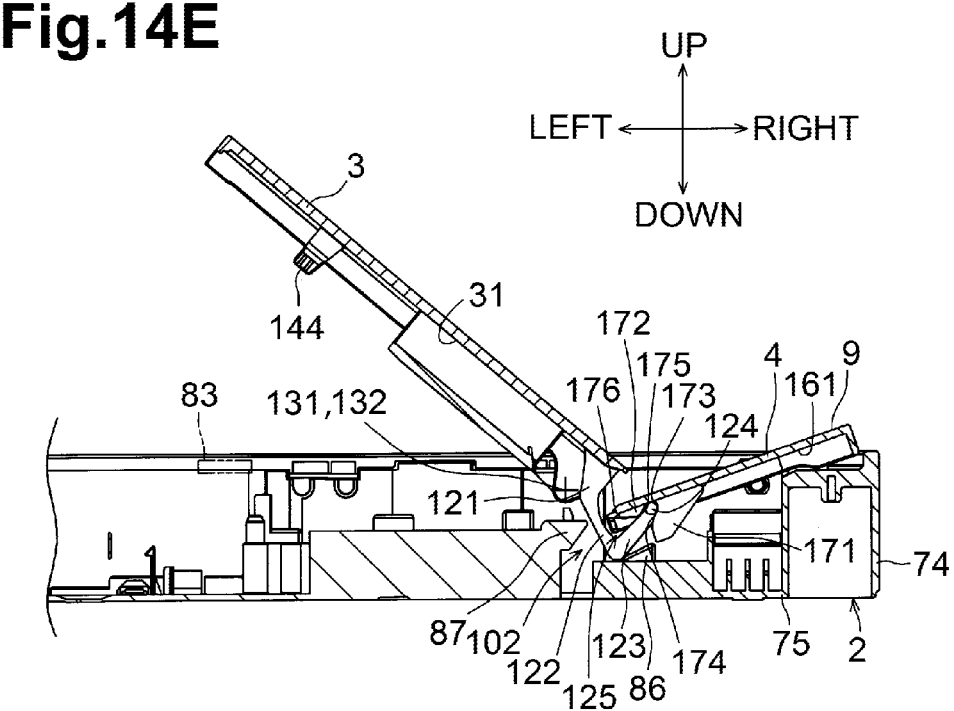
FIG. 14E is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover located in FIG. 14D.

As the first cover 3 pivots to a predetermined inclination angle, as depicted in FIG. 14E, the first cover 3 may move downward by its own weight and thus the shafts 131 and 132 may move to the lower ends of the grooves 81, respectively. Thereafter, the shafts 131 and 132 may stay on the lower ends of the grooves 81, respectively, until the first cover 3 moves back toward the tray position.

Figure 14F:
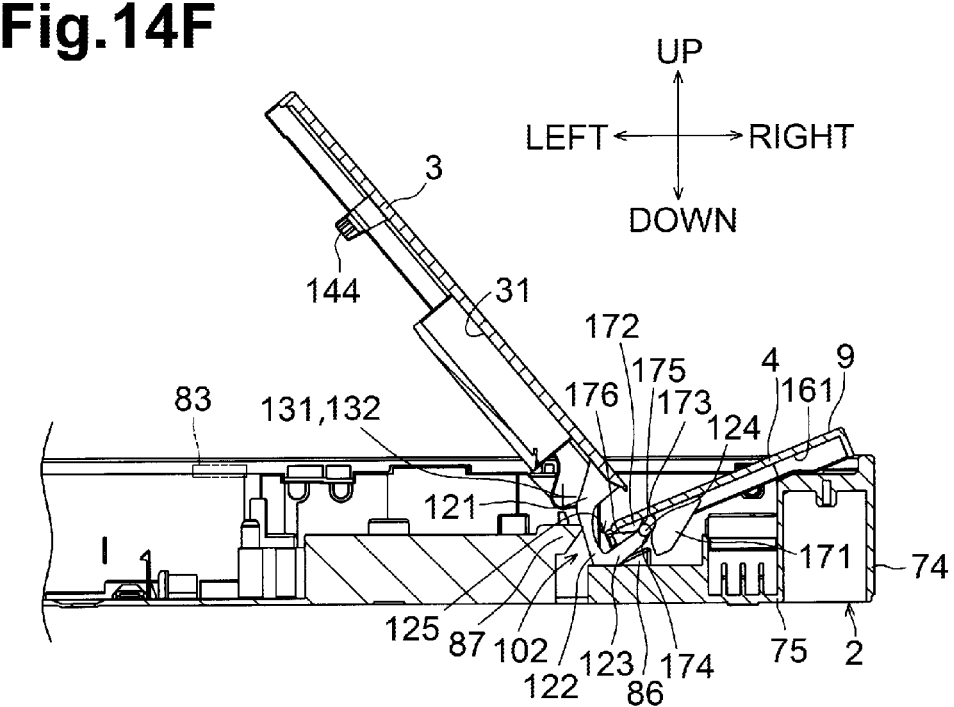
FIG. 14F is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14E.

In accordance with the further movement of the first cover 3, as depicted in FIG. 14F, the bosses 114 and 124 may move away from the pressed portions 174 of the acting portions 171, respectively.

Figure 14G:
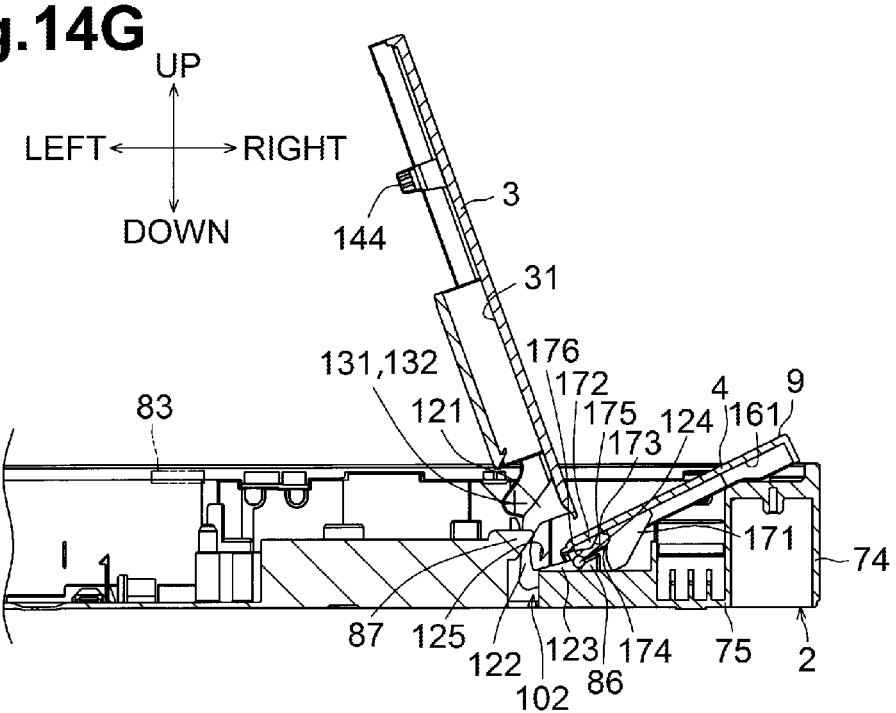
FIG. 14G is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14F.

As depicted in FIG. 14G, as the bosses 114 and 124 separate from the first inclined surfaces 175 of the lead-in portions 172, respectively, the second cover 4 may move downward by its own weight. Then, the second cover 4 may come into contact with the contact portion 86 of the housing 2, thereby restricting a further movement of the second cover 4. Accordingly, the second cover 4 may be retained at the lower position.

Figure 14H:
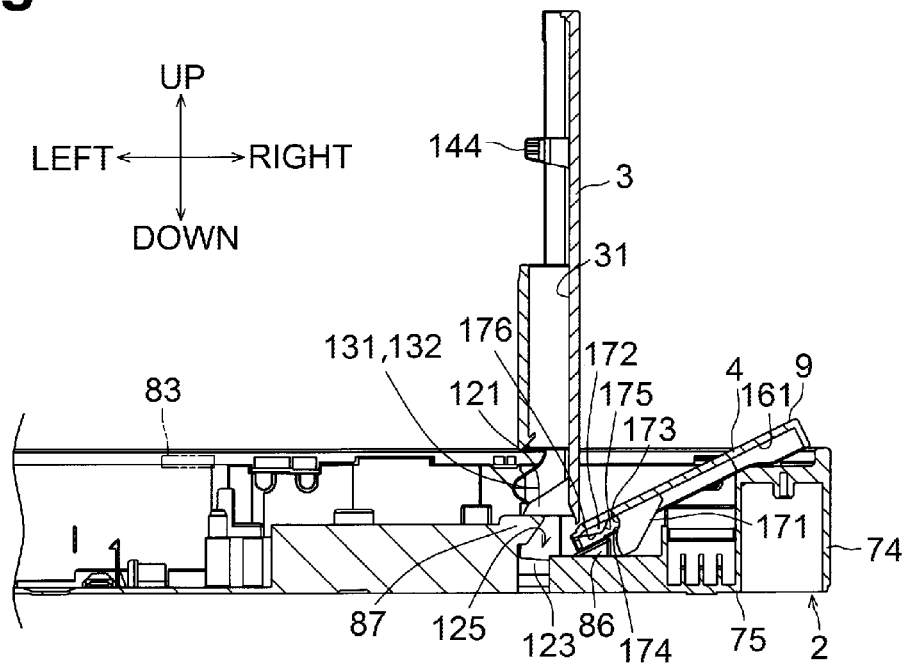
FIG. 14H is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14G.
Figure 14I:
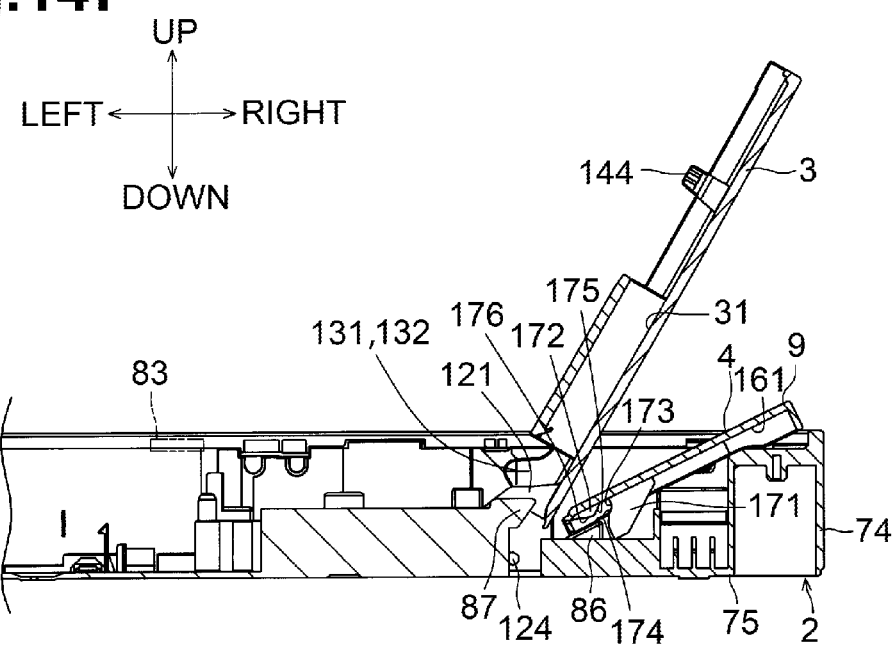
FIG. 14I is a sectional view of the right end portion of the image reading device in the illustrative embodiment according to one or more aspects of the disclosure, wherein the locations of the shafts and the boss are depicted in a state where the first cover is located at a position closer to the tray position than the position of the first cover depicted in FIG. 14H.
Figure 14J:
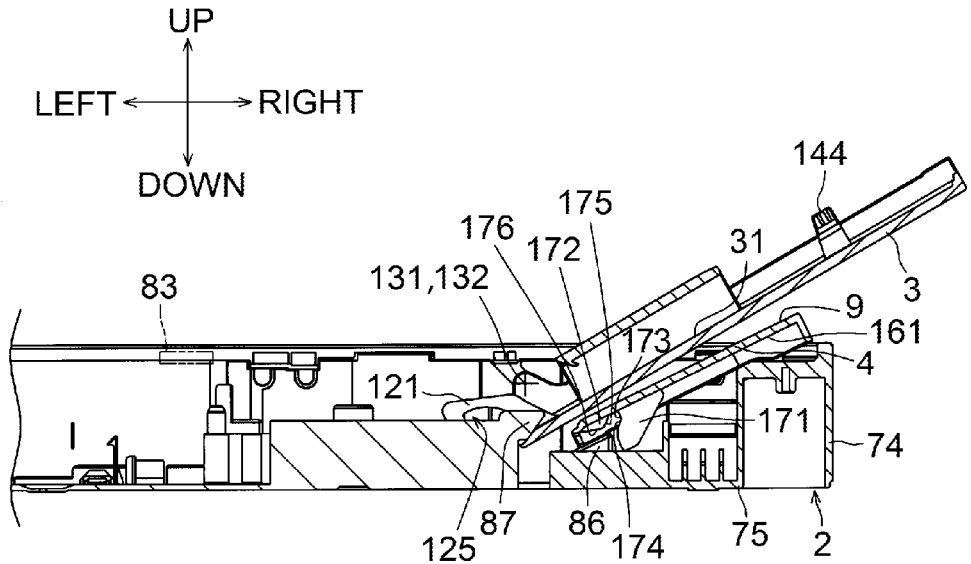
FIG. 14J is a sectional view of the right end portion of the image reading device in the illustrative embodiment according to one or more aspects of the disclosure, wherein the locations of the shafts and the boss are depicted in a state where the first cover is located at the tray position and the second cover is located at the lower position.

Thereafter, as the first cover 3 reaches the tray position by the further pivoting as depicted in FIGS. 14H and 14I, the right end portion of the first cover 3 may come into contact with the stopper 87 of the housing 2 from below as depicted in FIG. 14J. The contact of the right end portion of the first cover 3 and the stopper 87 of the housing 2 may restrict a further movement of the first cover 3. Accordingly, the first cover 3 may be retained at the tray position.

As the first cover 3 moves to a position depicted in FIG. 14F from the tray position toward the cover position, the bosses 114 and 124 may come into contact with the first inclined surfaces 175 of the lead-in portions 172, respectively. It may be conceivable that the first cover 3 may be deviated to an upper left position from a proper position with respect to the second cover 4 by the movement of the shafts 131 and 132 toward upper left within the respective grooves 81 due to an application of an upward force to the first cover 3 at that time. In this case, also, during the pivoting of the first cover 3, the bosses 114 and 124 may come into contact with the second inclined surfaces 176 of the lead-in portions 172, respectively, and then move along the respective second inclined surfaces 176. Thus, the bosses 114 and 124 may be guided onto the respective first inclined surfaces 175.

Thereafter, in accordance with a further pivoting of the first cover 3, the first inclined surfaces 175 may press the bosses 114 and 124, respectively, whereby the bosses 114 and 124 may be led into the respective positions, each of which may be defined between one of the first inclined surfaces 175 and one of the pressed portions 174. Then, the bosses 114 and 124 may move toward the respective wall portions 173 and thus the first cover 3 may move toward the second cover 4. In accordance with a further movement of the first cover 3 after the bosses 114 and 124 contact the lower surface 161 of the second cover 4, the left end portion of the second cover 4 may be lifted.

As the first cover 3 reaches the cover position, the second cover 4 may be located at the higher position and the upper surface 5 of the first cover 3, the upper surface 7 of the fixed cover 6, and the upper surface 9 of the second cover 4 may constitute the device upper surface 8 that may be flat. Before the first cover 3 reaches the cover position, the projecting portion 143 of the stopper protrusion 141 and the projecting portion 144 of the stopper protrusion 142 may come into contact with the respective stopper portions 83. Then, in accordance with the movement of the first cover 3 toward the cover position, the stopper protrusions 141 and 142 may be deformed elastically. As the first cover 3 reaches the cover position, the projecting portions 143 and 144 may be caught by the respective stopper portions 83 in the engaged state.

<Effects>

As described above, the first cover 3 may be configured to be movable between the cover position and the tray position and constitute a portion of the upper cover at the cover position. When the first cover 3 is not used to convey a sheet S, the first cover 3 may be located at the cover position to prevent an entry of dust into the inside of the housing 2.

The arms 101 and 102 that may extend toward the second cover 4 from the first cover 3 may be disposed below the first cover 3 that may be located at the cover position. The catch portions 164 and 165 may be disposed on the lower surface of the second cover 4 to catch the bosses 114 and 124, respectively, disposed at the distal end portions of the arms 101 and 102, respectively.

In accordance with the movement of the first cover 3 from the cover position to the tray position, the bosses 114 and 124 may move away from the second cover 4. In response to this, one end (e.g., the left end) of the second cover 4 may move downward, wherein the one end may be disposed closer to the first cover 3. The downward movement of the one end, which may be disposed closer to the first cover 3, of the second cover 4 may avoid an interference of the second cover 4 and the first cover 3 that is moving to the tray position, whereby the inclination angle of the first cover 3 at the tray position may be decreased. Consequently, a sheet S may be conveyed smoothly on the discharged-sheet support surface 31 of the first cover 3.

In accordance with the movement of the first cover 3 from the tray position to the cover position, the bosses 114 and 124 may move closer to the second cover 4. In response to this, the bosses 114 and 124 caught by the catch portions 164 and 165, respectively, may move the one end, which may be disposed closer to the first cover 3, of the second cover 4 upward and thus the second cover 4 may move back to the higher position at which the second cover 4 may constitute a portion of the upper cover. In the state where the first cover 3 and the second cover 4 constitute the portion of the upper cover, the device upper surface 8 may become flat, thereby providing a better appearance.

The arms 101 and 102 and the catch portions 164 and 165 may be disposed at the both end portions in the front-rear direction. Therefore, the first cover 3 and the second cover 4 may move stably in an interlocked manner.

The catch portions 164 and 165 may comprise the respective pressed portions 174 that may be pressed downward by the respective bosses 114 and 124 while the first cover 3 moves from the cover position to the tray position. Therefore, while the first cover 3 moves from the cover position to the tray position, the one end, which may be disposed closer to the first cover 3, of the second cover 4 may be surely moved downward regardless of the force of gravity exerted on the second cover 4. Consequently, this configuration may reduce an interference of the first cover 3 and the second cover 4 during the movement of the first cover 3 from the cover position to the tray position.

The shafts 131 and 132 of the first cover 3 may be supported in the grooves 81, respectively. This configuration may let the first cover 3 escape in a direction that the first cover 3 may move away from the second cover 4 while the first cover 3 moves from the cover position to the tray position. Therefore, an interference of the first cover 3 and the second cover 4 may be restricted while the first cover 3 moves from the cover position to the tray position. During the movement of the first cover 3 from the tray position to the cover position, the first cover 3 may move closer to the second cover 4. Consequently, clearance caused between the first cover 3 and the second cover 4 may be made smaller in a state where the first cover 3 may be located at the cover position, thereby further improving an appearance design.

In accordance with the movement of the first cover 3 from the tray position to the cover position, the lead-in portions 172 may lead the respective bosses 114 and 124 toward the wall portions 173. Thus, the first cover 3 may move closer to the second cover 4 appropriately. Accordingly, the first cover 3 and the second cover 4 may move smoothly in an interlocked manner.

In accordance with the movement of the first cover 3 from the cover position to the tray position, the wall portions 173 may press the respective bosses 114 and 124 to move the arms 101 and 102 apart from the second cover 4. Thus, the first cover 3 may move away from the second cover 4. Consequently, the first cover 3 and the second cover 4 may move smoothly in an interlocked manner while the interference of the first cover 3 and the second cover 4 is avoided.

Each of the lead-in portion 172 may protrude from the lower surface of the second cover 4 and may comprise the first inclined surface 175 and the second inclined surface 176. This simple configuration may implement the function of the lead-in portions 172. That is, such a simple configuration may allow the first cover 3 to move closer to the second cover 4 appropriately and move the first cover 3 and the second cover 4 smoothly in an interlocked manner.

The bosses 114 and 124 may separate from the lead-in portions 172, respectively, while the first cover 3 moves from the cover position to the tray position. Thus, the interlocking relationship of the first cover 3 and the second cover 4 may be released. Accordingly, the mechanism for interlocking the first cover 3 and the second cover 4 may be reduced in size and simplified as compared with a configuration in which the first cover 3 and the second cover 4 may move in an interlocked manner at all times.

The arms 101 and 102 may have the recesses 115 and 125, respectively. With this configuration, when the second cover 4 becomes inclined downward to the left, the one end, which may be disposed closer to the first cover 3, of the second cover 4 may come into the recesses 115 and 125. Thus, this configuration may avoid the arms 101 and 102 from interfering the downward movement of the second cover 4.

The recess 115 may be disposed between the one of the wall portions 173 and the shaft 131 and the recess 125 may be disposed between the other of the wall portions 173 and the shaft 132. Therefore, the one end, which may be disposed closer to the first cover 3, of the second cover 4 may be descended through the use of limited spaces defined between one of the shafts 131 and 132 and one of the wall portions 173.

In a state where the first cover 3 is located at the cover position, the projecting portion 177 of the second cover 4 may located below the first cover 3. Thus, when the first cover 3 is pressed from above, the first cover 3 may be supported by the projecting portion 177 from below, thereby reducing deformation of the first cover 3.

The contact portion 86 may be disposed on the upper surface of the bottom plate 75. In a state where the second cover 4 is located at the lower position, the second cover 4 may be in contact with the contact portion 86 of the housing 2 and thus the second cover 4 may be retained at the lower position. Therefore, at the time of assembling the image processing device 1, other members, such as the first cover 3, may be assembled while the second cover 4 may be retained at the lower position. Consequently, time and trouble taken in the assembling of the image processing device 1 may be saved.

<Variations>

Hereinabove, the illustrative embodiment of the disclosure has been described. The aspects of the disclosure may be implemented by other embodiments.

In the above-described illustrative embodiment, the arms 101 and 102 and the catch portions 164 and 165 may be disposed on both the end portions in the front-rear direction. Nevertheless, in other embodiments, for example, a pair of arm and a catch portion may be disposed at the middle portion in the front-rear direction.

The aspects of the disclosure may be applied to another image processing device. The image processing device may comprise a pre-fed-sheet mount portion, on which one or more pre-fed sheets S may be placed, and a discharged-sheet mount portion, on which one or more discharged sheets S may be placed. The discharged-sheet mount portion may be disposed above the pre-fed-sheet mount portion. In the image processing device, a sheet S may be conveyed upward from the pre-fed-sheet mount portion to the discharged-sheet mount portion.

While the disclosure has been described in detail with reference to the specific embodiments thereof, various changes, arrangements and modifications may be applied therein without departing from the spirit and scope of the disclosure.

What is claimed is:

1. An image processing device, comprising:
a housing;
a sheet conveyor situated in the housing;
a first cover part movably connected to the housing and having a first surface and a second surface opposite the first surface, the first cover part being movable between a first position and a second position;
a second cover part movably connected to the housing and having a first surface and a second surface opposite the first surface, the second cover part being movable between a first position and a second position;
an interlock mechanism comprising:
 a first engagement member extending from the second surface of the first cover; and
 a second engagement member extending from the second surface of the second cover, one of the first and second engagement members being engagable with the other of the first and second engagement members;
wherein in the interlock mechanism, when the first cover moves from the first position to the second position, the first and second engagement members engage to move the second cover in response to a movement of the first engagement member away from the second cover, and when the first cover moves from the second position to the first position, the first and second engagement members engage to move the second cover to the first position.

2. The image processing device according to claim 1, wherein:
the first engagement member includes an arm extending toward the second cover from the second surface of the first cover, the arm comprising a boss at a distal portion thereof;
the second engagement member includes a catch portion extending from the second surface of the second cover having a pressed portion that is configured to be pressed by the boss when the first cover moves from the first position to the second position.

3. The image processing device according to claim 2, wherein:
the first cover comprises a shaft that protrudes in a width direction perpendicular to the sheet conveyance direction, and is configured to pivot on the shaft between the cover position and the uncover position
wherein the housing has a groove in which the shaft is supported.

4. The image processing device according to claim 2, wherein the catch portion comprises:
a wall portion configured to contact the boss from the second surface of the first cover when the first cover is in the first position; and
a lead-in portion disposed apart from the wall portion toward the first cover when the first cover is in the first position, and configured to contact the boss to lead the boss toward the wall portion when the first cover moves from the second position to the first position.

5. The image processing device according to claim 4, wherein the wall portion is configured to press the boss to move the arm apart from the second cover when the first cover moves from the first position to the second position.

6. The image processing device according to claim 4, wherein the lead-in portion protrudes from the second surface of the second cover and comprises:
a first inclined surface that is inclined toward the second surface as the first inclined surface nears the wall portion; and
a second inclined surface that is inclined toward the second surface as the second inclined surface is distant from the wall portion.

7. The image processing device according to claim 4, wherein the boss separates from the lead-in portion while the first cover moves from the first position to the second position.

8. The image processing device according to claim 4, wherein the arm has a recess that receives the second cover in response to the movement of the first cover from the first position to the second position.

9. The image processing device according to claim 8, wherein the arm extends from an end portion of the first cover, the recess is disposed between the wall portion and the shaft.

10. The image processing device according to claim 2, wherein the arm has a recess that receives the second cover in response to movement of the first cover from the first position to the second position.

11. The image processing device according to claim 1, wherein the second cover comprises a projecting portion which extends from an end portion of the second cover to support the second surface of the first cover in the first position.

12. The image processing device according to claim 2, wherein the arm is disposed at an end portion of the first cover in a width direction perpendicular to the conveyance direction, and
wherein the catch portion is at an end portion of the second surface of the second cover in the width direction perpendicular to the conveyance direction in correspondence with one or both of the arms.

13. The image processing device according to claim 2, wherein the first cover part includes a sheet feed support surface and a sheet discharge support surface.

14. The image processing device according to claim 2, wherein the interlock mechanism includes:
two first engagement members spaced apart from one another, such that the boss of the respective first engagement members extend towards one another; and
two second engagement members spaced apart from one another.

15. The image processing device according to claim 1, further comprising a first image sensor module situated in the housing.

16. The image processing device according to claim 15, further comprising a second image sensor module situated adjacent the housing, the first and second image sensor modules both configured to read a sheet conveyed by the sheet conveyor.

17. The image processing device according to claim 1, wherein the second surface of the second cover comprises a pivot shaft which supports the second cover swingabley, and the pivot shaft is disposed inside an edge of the second cover in a width direction perpendicular to the conveyance direction.

18. The image processing device according to claim 1, wherein the housing includes a contact portion configured to be in contact with the second cover when the second cover is in the second position.

19. The image processing device according to claim 1, wherein the first surfaces of the first and second cover parts are arranged generally coplanar when in the respective first positions.

20. The image processing device according to claim 1, wherein the first positions of the first and second covers is a covered position wherein the first and second covers cover the housing, and wherein the second positions of the first and second covers is a tray position wherein the first cover protrudes from the housing and functions as a document support tray, and where the first and second covers are substantially parallel to one another in their respective second positions.

* * * * *